US012124185B2

(12) United States Patent
Minagawa et al.

(10) Patent No.: US 12,124,185 B2
(45) Date of Patent: Oct. 22, 2024

(54) IMAGE FORMING APPARATUS APPLYING DIFFERENT VOLTAGES IN IMAGE FORMING OPERATION AND CLEANING OPERATION

(71) Applicant: CANON KABUSHIKI KAISHA, Tokyo (JP)

(72) Inventors: Taisuke Minagawa, Shizuoka (JP); Hiroki Asano, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/944,587

(22) Filed: Sep. 14, 2022

(65) Prior Publication Data

US 2023/0095217 A1 Mar. 30, 2023

(30) Foreign Application Priority Data

Sep. 17, 2021 (JP) ................................ 2021-152693

(51) Int. Cl.
*G03G 15/06* (2006.01)
*G03G 15/16* (2006.01)

(52) U.S. Cl.
CPC ....... *G03G 15/065* (2013.01); *G03G 15/1675* (2013.01)

(58) Field of Classification Search
None
See application file for complete search history.

(56) References Cited

U.S. PATENT DOCUMENTS 5,708,929 A 1/1998 Adachi et al.
6,173,135 B1 1/2001 Yuminamochi et al.
6,185,387 B1 2/2001 Ohzeki et al.
8,145,091 B2 3/2012 Inada
10,496,028 B2 12/2019 Minagawa et al.
10,503,108 B2 * 12/2019 Kubota ............. G03G 15/0283
(Continued)

FOREIGN PATENT DOCUMENTS

JP 07-239588 A 9/1995
JP 08-248785 A 9/1996
(Continued)

OTHER PUBLICATIONS

Extended European Search Report dated May 11, 2023, in European Patent Application No. 22194334.3.

*Primary Examiner* — Arlene Heredia
(74) *Attorney, Agent, or Firm* — Venable LLP

(57) ABSTRACT

An image forming apparatus includes a rotatable photosensitive member, a charging member, an exposure unit, a developing member, a developing voltage applying portion, a transfer member, a first transfer voltage applying portion, a second transfer voltage applying portion, a common power source, and a controller. The controller carries out control so as to execute an image forming operation, and a non-image forming operation and so as to execute, as the non-image forming operation, a cleaning operation. The controller controls a change in output of the common power source so that a value of a voltage applied from the developing voltage applying portion to the developing member during the cleaning operation is made different from a value of a voltage applied from the developing voltage applying portion to the developing member during formation of the toner image.

2 Claims, 20 Drawing Sheets

(56) References Cited

U.S. PATENT DOCUMENTS

| | | | | |
|---|---|---|---|---|
| 2018/0341192 | A1 | 11/2018 | Kanazawa | |
| 2019/0163099 | A1 | 5/2019 | Ishikawa | |
| 2022/0197175 | A1* | 6/2022 | Kobayashi | G03G 15/065 |

FOREIGN PATENT DOCUMENTS

| | | | |
|---|---|---|---|
| JP | 2000-029281 | A | 1/2000 |
| JP | 2000-137423 | A | 5/2000 |
| JP | 2007-206414 | A | 8/2007 |
| JP | 2008-256834 | A | 10/2008 |
| JP | 2009-294421 | A | 12/2009 |
| JP | 2016-148836 | A | 8/2016 |

* cited by examiner

IMAGE FORMING APPARATUS APPLYING DIFFERENT VOLTAGES IN IMAGE FORMING OPERATION AND CLEANING OPERATION

FIELD OF THE INVENTION AND RELATED ART

The present invention relates to an image forming apparatus, such as a printer, a copying machine, or a facsimile machine, of an electrophotographic type.

Conventionally, in the image forming apparatus of the electrophotographic type, a surface of an electrophotographic photosensitive member having a drum shape in general is electrically charged by a charging means, and the charged surface of the photosensitive member is exposed to light by an exposure means, so that an electrostatic latent image is formed on the photosensitive member. Then, toner is deposited on the electrostatic latent image, formed on the photosensitive member, by a developing means, so that a toner image is formed on the photosensitive member and then is transferred onto a sheet-like recording material such as a recording sheet by a transfer means. Here, the recording material on which the image is formed in the image forming apparatus is referred to as "paper" in some instances, but is not limited to the paper. As the transfer means, a transfer roller which is a roller-like transfer member provided opposed to the photosensitive member and for forming a transfer nip (transfer portion) between itself and the photosensitive member in press-contact with the photosensitive member has been widely used. In this case, the recording material is fed to the transfer nip, and a transfer voltage of an opposite polarity to a normal charge polarity of the toner is applied to the transfer roller, so that charges are imparted to the recording material and thus the toner image on the photosensitive member is transferred onto the recording material.

In such an image forming apparatus, the toner (image) on the photosensitive member is directly transferred onto the transfer roller in the case where an image forming operation was repetitively carried out or in the case where a jam of the recording material (paper jam) occurred, so that the toner is deposited on the transfer roller in some instances. In the case where an amount of the toner deposited on the transfer roller is relatively large, during a subsequent image forming operation and later, a "paper back contamination" phenomenon such that the toner deposited on the transfer roller is transferred onto a back surface (surface on a transfer roller side) of the recording material and thus the back surface is contaminated with the toner occurs in some instances.

Therefore, a constitution in which the following transfer roller cleaning operation is performed has been known (Japanese Laid-Open Patent Application No. 2000-29281). That is, "during non-sheet (paper) passing" in which the recording material is not present in the transfer nip, a voltage of the same polarity as the normal charge polarity of the toner is applied to the transfer roller, so that the toner deposited on the transfer roller is transferred onto the photosensitive member (reverse transfer) and thus the transfer roller is cleaned. By executing such a cleaning operation, the paper back contamination can be suppressed.

For example, in the case where the above-described cleaning operation is executed, in order to transfer the toner of the normal charge polarity, deposited on the transfer member, from the transfer member onto the photosensitive member, a power source for applying the voltage of the same polarity as the normal charge polarity of the toner to the transfer member is needed. In the conventional constitution, a power source for applying, to the transfer roller, a cleaning voltage for cleaning the transfer roller was individually provided. However, in recent years, due to demands for further downsizing and further cost reduction of the image forming apparatus, a constitution in which the power source for applying the voltage of the same polarity as the normal charge polarity of the toner is not individually provided has been desired.

Therefore, for example, it would be considered that commonality in power source between the cleaning voltage and a charging voltage is achieved. However, for example, in such a constitution, when a value of the cleaning voltage is intended to be changed to a value suitable for the cleaning during the cleaning operation, such a phenomenon that a surface potential of the photosensitive member is changed from an appropriate value occurs in some instances. In this case, a potential difference between the transfer roller and the photosensitive member for electrostatically transferring the toner, deposited on the transfer roller, onto the photosensitive member is changed, and therefore, a transfer roller cleaning performance is not stabilized in some instances.

Thus, for example, as a constitution in which the transfer roller is not individually provided with the power source for applying the cleaning voltage, it has been desired that downsizing and cost reduction of the image forming apparatus and stable cleaning of the transfer roller are compatibly realized. There can arise the same problem that an operation requiring the power source for applying the same polarity as the normal charge polarity of the toner to the transfer member is executed as the non-image forming operation different from the image forming operation for forming the toner image on the recording material.

SUMMARY OF THE INVENTION

Accordingly, a principal object of the present invention is to provide an image forming apparatus in which a voltage of the same polarity as a normal charge polarity of toner is effectively applied to a transfer member while realizing downsizing and cost reduction of the image forming apparatus without providing an independent power source for applying the voltage of the same polarity as the normal charge polarity of the toner to the transfer member.

The object is achieved by the present invention. According to an aspect of the present invention, there is provided an image forming apparatus comprising: a rotatable photosensitive member; a charging member configured to electrically charge a surface of the photosensitive member; an exposure unit configured to form an electrostatic latent image on the charged surface of the photosensitive member by exposing the charged surface of the photosensitive member to light; a developing member configured to form a toner image by depositing toner on the electrostatic latent image; a developing voltage applying portion configured to apply a developing voltage to the developing member; a transfer member forming a transfer portion in contact with the surface of the photosensitive member and configured to transfer the toner image from the surface of the photosensitive member onto a recording material passing through the transfer portion; a first transfer voltage applying portion configured to apply, to the transfer member, a transfer voltage of an opposite polarity to a normal charge polarity of the toner; a second transfer voltage applying portion configured to apply, to the transfer member, a transfer voltage of the same polarity as the normal charge polarity of the toner; a common power source configured to supply voltages to the developing voltage applying portion and the second transfer voltage applying portion; and a controller capable of controlling the common power source, wherein the controller carries out control so as to execute an image forming operation for forming the toner image on the recording material and a non-image forming operation different from the image forming operation and so as to execute, as the non-image forming operation, a cleaning operation for moving the toner from the transfer member onto the photosensitive member under application of the voltage of the same polarity as the normal charge polarity from the second transfer voltage applying portion to the transfer member when the recording material is absent in the transfer portion, and the controller controls the common power source in the non-image forming operation, and wherein the controller controls a change in output of the common power source so that a value of the voltage applied from the developing voltage applying portion to the developing member during the cleaning operation is made different from a value of the voltage applied from the developing voltage applying portion to the developing member during formation of the toner image.

According to another aspect of the present invention, there is provided an image forming apparatus comprising: a rotatable photosensitive member; a charging member configured to electrically charge a surface of the photosensitive member; a charging voltage applying portion configured to apply a charging voltage to the charging member; an exposure unit configured to form an electrostatic latent image on the charged surface of the photosensitive member by exposing the charged surface of the photosensitive member to light; a developing member configured to form a toner image by depositing toner on the electrostatic latent image; a developing voltage applying portion configured to apply a developing voltage to the developing member; a transfer member forming a transfer portion in contact with the surface of the photosensitive member and configured to transfer the toner image from the surface of the photosensitive member onto a recording material passing through the transfer portion; a first transfer voltage applying portion configured to apply, to the transfer member, a transfer voltage of an opposite polarity to a normal charge polarity of the toner; a second transfer voltage applying portion configured to apply, to the transfer member, a transfer voltage of the same polarity as the normal charge polarity of the toner; a common power source configured to supply voltages to the developing voltage applying portion, the charging voltage applying portion, and the second transfer voltage applying portion; and a controller capable of controlling the common power source, wherein the controller carries out control so as to execute an image forming operation for forming the toner image on the recording material and a non-image forming operation different from the image forming operation and so as to execute, as the non-image forming operation, a cleaning operation for moving the toner from the transfer member onto the photosensitive member under application of the voltage of the same polarity as the normal charge polarity from the second transfer voltage applying portion to the transfer member when the recording material is absent in the transfer portion, and the controller controls the common power source in the non-image forming operation, and wherein the controller controls a change in output of the common power source so that at least one of an operation in which a value of the voltage applied from the developing voltage applying portion to the developing member during the cleaning operation is made different from a value of the voltage applied from the developing voltage applying portion to the developing member during formation of the toner image and an operation in which a value of the voltage applied from the charging voltage applying portion to the charging member during the cleaning operation is made different from a value of the voltage applied from the charging voltage applying portion to the charging member during the charging.

According to a further aspect of the present invention, there is provided an image forming apparatus comprising: a rotatable photosensitive member; a charging member configured to electrically charge a surface of the photosensitive member; an exposure unit configured to form an electrostatic latent image on the charged surface of the photosensitive member by exposing the charged surface of the photosensitive member to light; a developing member configured to form a toner image by depositing toner on the electrostatic latent image; a developing voltage applying portion configured to apply a developing voltage to the developing member; a transfer member forming a transfer portion in contact with the surface of the photosensitive member and configured to transfer the toner image from the surface of the photosensitive member onto a recording material passing through the transfer portion; a first transfer voltage applying portion configured to apply, to the transfer member, a transfer voltage of an opposite polarity to a normal charge polarity of the toner; a second transfer voltage applying portion configured to apply, to the transfer member, a transfer voltage of the same polarity as the normal charge polarity of the toner; a common power source configured to supply voltages to the developing voltage applying portion and the second transfer voltage applying portion; and a controller capable of controlling the common power source, wherein the controller carries out control so as to execute an image forming operation for forming the toner image on the recording material and a non-image forming operation different from the image forming operation, and controls the common power source in the non-image forming operation, and wherein when the voltage of the opposite polarity is applied to the transfer member the controller carried out control so that to the first transfer voltage applying portion, a voltage in a superposed form of the voltage of the same polarity outputted from the common power source and the voltage of the opposite polarity outputted from another power source is supplied.

Further features of the present invention will become apparent from the following description of exemplary embodiments with reference to the attached drawings.

DESCRIPTION OF THE EMBODIMENTS

In the following, an image forming apparatus according to the present invention will be described specifically with reference to the drawings.

(1) Image Forming Apparatus

A general constitution and operation of an image forming apparatus 1 according to an embodiment 1 will be described using FIG. 1.

Figure 1:
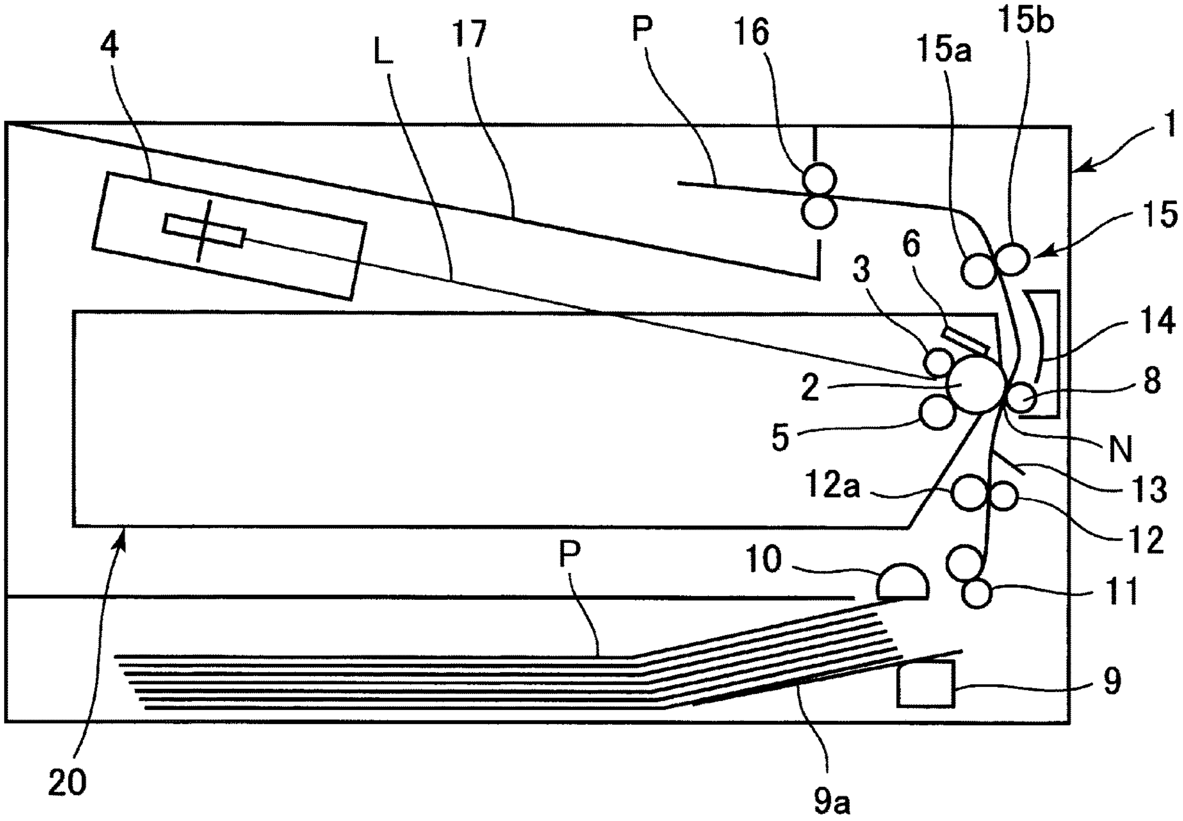
FIG. 1 is a schematic sectional view of an image forming apparatus.

FIG. 1 is a schematic sectional view of the image forming apparatus 1 of this embodiment. The image forming apparatus 1 of this embodiment is a laser beam printer of an electrophotographic type and forms an image on a recording material P, such as paper or a plastic film, depending on image information inputted from an external device 200 (FIG. 3) such as a host computer.

The image forming apparatus 1 includes a rotatable drum-shaped (cylindrical) photosensitive member (photosensitive drum) 2 as an image bearing member. When a print instruction (print job start instruction) is inputted from the external device 200 to the image forming apparatus 1, the photosensitive member 2 is rotationally driven at a predetermined peripheral speed (process speed) in a counterclockwise direction in FIG. 1 by a driving force transmitted from a driving source (not shown).

In this embodiment, the photosensitive member 2 is constituted by forming an OPC (organic photoconductor: organic photosensitive member) layer on an aluminum cylinder. In this embodiment, the OPC layer includes a 20 μm-thick CT layer (charge transfer layer: charge transport layer) principally formed with a polycarbonate-based binder. Further, in this embodiment, an outer diameter of the photosensitive member 2 is 30 mm.

A surface (outer peripheral surface) of the rotating photosensitive member 2 is electrically charged uniformly to a predetermined polarity (negative polarity in this embodiment) and a predetermined potential by a charging roller 3 which is rotatable roller-shaped charging member as a charging means. In this embodiment, the charging roller 3 is an elastic (member) roller with a single layer constitution in which an electroconductive elastic layer is coated around an electroconductive core metal. In this embodiment, the charging roller 3 is pressed toward the photosensitive member 2 by a pressing means (not shown) at each of opposite end portions of the electroconductive core metal with respect to a longitudinal direction, and is rotated with the rotation of the photosensitive member 2 in contact with the surface of the photosensitive member 2. In this embodiment, during the charging, to the charging roller 3, a predetermined charging voltage (charging bias) which is a DC voltage of the negative polarity is applied. Incidentally, with respect to a rotational direction of the photosensitive member 2, a position on the photosensitive member 2 where the photosensitive member surface is charged by the charging roller 3 is a charging position. The charging roller 3 charges the surface of the photosensitive member 2 by electric discharge generating in at least one of minute gaps, between the photosensitive member 2 and the charging roller 3, formed on sides upstream and downstream of a contact portion between the photosensitive member 2 and the charging roller 3 with respect to the rotational direction of the charging roller 3. However, it would be considered that a position on the photosensitive member 2 where the photosensitive member 2 contacts the charging roller 3 is regarded as the charging position.

The charged surface of the photosensitive member 2 is subjected to scanning exposure to light depending on the image information by a laser scanner (exposure device, exposure unit) 4 as an exposure means. The laser scanner 3 outputs laser light L modulated depending on a time-series electric digital pixel signal of the image information inputted from the external device 200 to the image forming apparatus 1. Then, the laser scanner 4 subjects the charged surface of the photosensitive member 2 to the scanning exposure by the laser light L. By this, an electrostatic latent image (electrostatic image) depending on the image information is formed on the photosensitive member 2.

The electrostatic latent image formed on the photosensitive member 2 is developed (made visible or visualized) by being supplied with toner as a developer by a developing device 5 as a developing means, so that a toner image (developer image) is formed on the photosensitive member 2. In this embodiment, by the developing device 5, toner charged to the same polarity (the negative polarity in this embodiment) as a charge polarity of the photosensitive member 2 is deposited on an exposure portion (image portion) of the photosensitive member 2 where an absolute value of a potential is lowered by exposing the photosensitive member surface to the light after the photosensitive member surface is uniformly charged (reverse development type). In this embodiment, during the development, to a developing roller (described later) of the developing device 5, a predetermined developing voltage (developing bias) which is a DC voltage of the negative polarity is applied. In this embodiment, a normal charge polarity of the toner (normal polarity) which is the charge polarity of the toner during the development is the negative polarity. Further, in this embodiment, the developing device 5 uses a non-magnetic one-component developer as the developer. However, as the developer, the developing device 5 may use a magnetic one-component developer or a two-component developer containing toner and a carrier. Incidentally, with respect to the rotational direction of the photosensitive member 2, a position on the photosensitive member 2 where the electrostatic latent image is developed by the developing device 5 (a position on the photosensitive member 2 where the photosensitive member 2 and the developing roller are in contact with each other in this embodiment) is a developing position.

A transfer roller 8 which is a rotatable roller-shaped transfer member (rotatable transfer member) as a transfer means is provided opposed to the photosensitive member 2. In this embodiment, the transfer roller 8 is an elastic roller which is 14 mm in outer diameter and which is prepared by forming a sponge-like elastic layer formed in a thickness of 4.5 mm with NBR (acrylonitrile-butadiene rubber) or hydrin rubber on a core metal formed in an outer diameter of 5 mm with SUS (stainless steel). In this embodiment, the transfer roller 8 is pressed toward the photosensitive member 2 and forms a transfer nip (transfer portion) N which is a contact portion between the surface (outer peripheral surface) and a surface (outer peripheral surface) of the transfer roller 8. The transfer roller 8 is rotated with rotation of the photosensitive member 2. The toner image on the photosensitive member 2 is sent to the transfer nip N by the rotation of the photosensitive member 2. Incidentally, a position on the photosensitive member 2 where the toner image is transferred from the photosensitive member 2 onto the recording material P with respect to the rotational direction of the photosensitive member P (a position on the photosensitive member 2 where the photosensitive member 2 and the transfer roller 8 are in contact with each other in this embodiment) is a transfer position, and a position on the photosensitive member 2 where the above-described transfer nip N is formed corresponds to the transfer position.

Sheet-like recording materials P such as recording sheets or the like stacked on a sheet stacking table 9*a* of a sheet (paper) feeding cassette 9 are picked-up one by one by a sheet feeding roller 10 driven with a predetermined control timing, and the recording material P is sent toward a registration portion by a feeding roller pair 11. In the registration portion, a leading end of the recording material P is once received in a nip between a registration roller 12 and a roller 12*a*, so that the recording material P is subjected to oblique movement correction. Further, in the registration portion, on a side downstream of the registration roller 12 and the roller 12*a* with respect to a feeding direction of the recording material P, a registration sensor 13 as a recording material detecting means is provided. By this registration sensor 13, an arrival timing of each of the leading end and a trailing end of the recording material P is detected. Thereafter, the recording material P is fed from the registration portion toward the transfer nip N. The recording material P fed to the transfer nip n is nipped and fed by the photosensitive member 2 and the transfer roller 8. To the transfer roller 8, in a process in which the recording material P is fed, a predetermined transfer voltage (transfer bias) which is a DC voltage of an opposite polarity (positive polarity in this embodiment) to the normal charge polarity of the toner is applied by a transfer voltage applying portion E2 (FIG. 3), so that the toner image on the photosensitive member 2 is transferred onto the recording material P.

The recording material P separated from the surface of the photosensitive member 2 is fed toward a fixing device 15 as a fixing means along a feeding guide 14. The fixing device 15 includes a rotatable fixing member 15*a* such as a fixing film and a pressing member 15*b* such as a pressing roller or the like press-contacting the rotatable fixing member 15*a*. The fixing device 15 heats and presses the recording material P, on which an unfixed toner image is carried, in a fixing nip between the rotatable fixing member 15*a* and the rotatable pressing member 15*b*, so that the toner image is fixed on the recording material P. The recording material P after the toner image is fixed thereon is discharged from the fixing nip of the fixing developing voltage 15 and is conveyed by a discharging roller 16. The discharging roller 16 discharges (outputs) the recording material P onto a discharge tray 17 provided outside an apparatus main assembly of the image forming apparatus 1.

On the other hand, a deposited matter such as toner (transfer residual toner) remaining on the surface of the photosensitive member 2 after the recording material P is separated from the photosensitive member 2 is removed and collected from the surface of the photosensitive member 2 by a cleaner 6 as a photosensitive member cleaning means. By this, the photosensitive member 2 is subjected to repetitive image formation.

Here, in a series of image forming operations, there is a timing which is a so-called "during non-sheet passing" in which the recording material P does not exist in the transfer nip N. The following timings correspond to this "during non-sheet passing". First, a preparation state (during pre-rotation) until each of members is in an image formable state in a stage of a start of the image forming operation corresponds thereto. Further, a timing (sheet (paper) interval) between a recording material P and a subsequent recording material P in a situation in which a plurality of recording materials P are continuously fed during the image forming operation corresponds thereto. Further, during an operation stop process (during post-rotation) after the series of image forming operations is ended corresponds thereto. In these timings, a small amount of the toner which is called "fog toner" occurring on the surface of the photosensitive member 2 is transferred onto the surface of the transfer roller 8 in some cases. For that reason, the image forming apparatus 1 of this embodiment executes a cleaning operation (cleaning sequence) for removing the toner such as the fog toner deposited on the transfer roller 8, during the operation stop process (during the post-rotation), which is the "during non-sheet passing", and after the series of image forming operations is ended. In the cleaning operation, to the transfer roller 8, a predetermined cleaning voltage (cleaning bias) which is a DC voltage of the same polarity (the negative polarity in this embodiment) as the normal charge polarity of the toner is applied. By this, the toner such as the above-described fog toner deposited on the transfer roller 8 is transferred (reverse transfer) onto the photosensitive member 2. The toner transferred on the photosensitive member 2 is removed and collected from the surface of the photosensitive member 2 by the cleaner 6. The "fog toner" will be further described later specifically.

Incidentally, the image forming apparatus 1 of this embodiment is operated at a print speed of 55 sheets/min (in the case of letter-size paper), and a process speed (corresponding to a peripheral speed of the photosensitive member 2) is about 300 mm/s.

Figure 2:
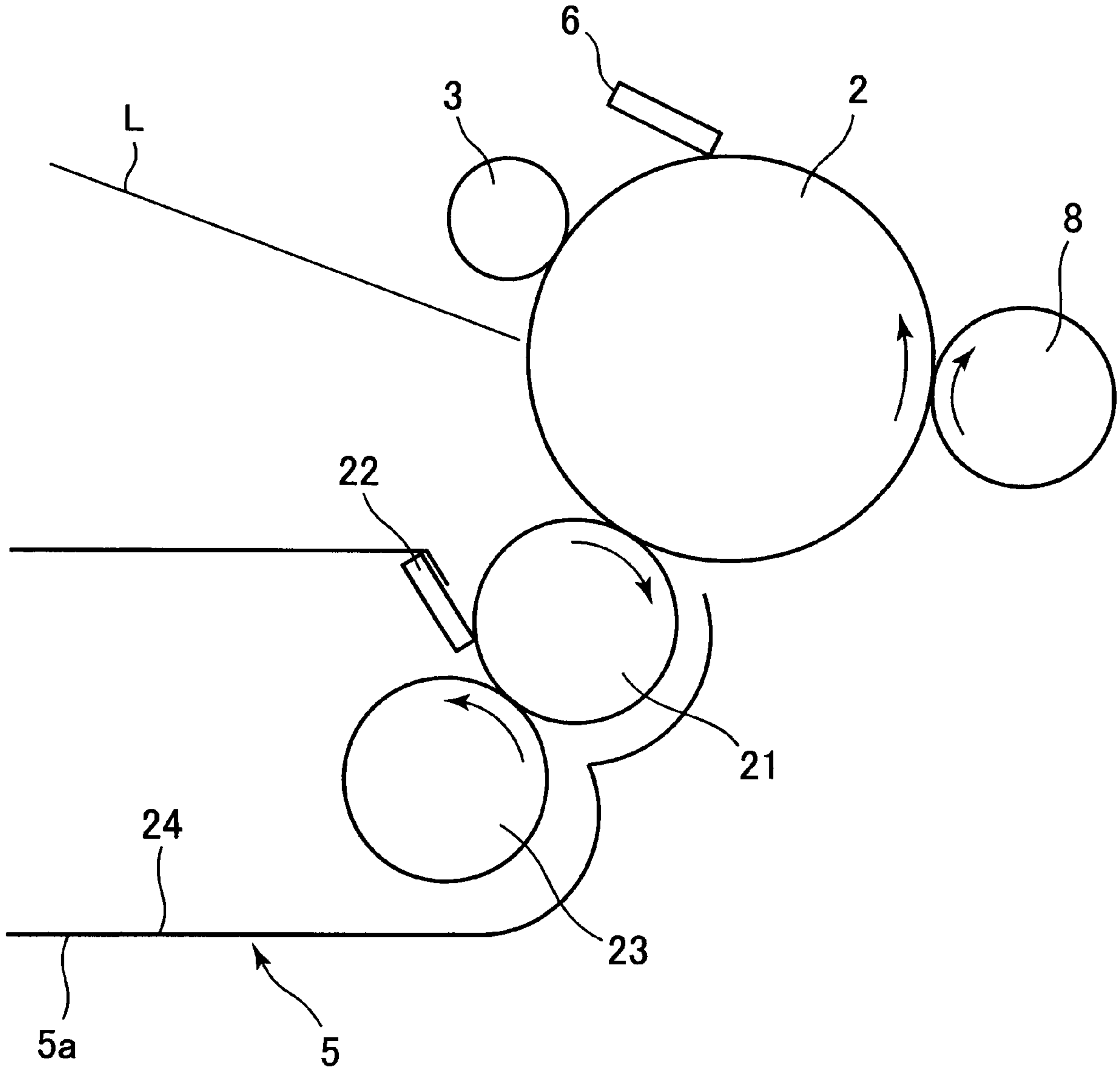
FIG. 2 is a schematic sectional view of an image forming portion.

Next, a constitution of an image forming portion (the photosensitive member 2 and process means actable on the photosensitive member 2) in the image forming apparatus 1 of this embodiment will be further described using FIG. 2. FIG. 2 is a schematic sectional view showing the constitution of the image forming portion of the image forming apparatus 1 of this embodiment.

To the charging roller 3, the predetermined charging voltage (charging bias), which is the DC voltage of the same polarity (the negative polarity in this embodiment) as the normal charge polarity of the toner, is applied by a charging voltage applying portion E1 (FIG. 3) (described later), so that the surface of the photosensitive member 2 is uniformly charged. In this embodiment, during the charging, to the charging roller 3, the charging voltage of about −1000 V is applied so that the surface potential of the photosensitive member 2 becomes-500 V. The surface potential (charge potential) formed by charging the photosensitive member surface by the charging roller 3 is referred to as a "dark-portion potential Vd".

The laser scanner 4 subjects the charged surface of the photosensitive member 2 to scanning exposure by the laser light L and thus removes electric charges on the surface of the photosensitive member 2, so that the electrostatic latent image is formed on the surface of the photosensitive member 2. The surface potential of the photosensitive member 2 at a portion exposed to light by the laser scanner 4 is referred to as a "light-portion potential VL". In this embodiment, a light emission amount of the laser scanner 4 is adjusted so that the light-portion potential VL becomes −100 V.

The developing device 5 includes a developing roller 21 as a developer carrying member, a developing blade 22 as a regulating member, a supplying roller 23 as a supplying member, an accommodating chamber 24 for accommodating the toner, and the toner as a developer accommodated in the accommodating portion 24. In this embodiment, as the toner, non-magnetic spherical toner of which normal charge polarity is the negative polarity and of which average particle size is 7 μm was used. Further, in this embodiment, to a surface of the toner, as an external additive, silica particles (external additive particles) of 20 nm in average particle size are added (externally added).

The developing blade 22 is constituted by a plate-like member having a rectangular shape in plan view, which has a predetermined length in each of a longitudinal direction substantially parallel to a rotational axis direction of the developing roller 21 and in a widthwise (short-side) direction substantially perpendicular to this longitudinal direction and which has a predetermined thickness. The developing blade 22 contacts a surface (outer peripheral surface) of the developing roller 21 in a counter direction to a rotational direction of the developing roller 21. That is, the developing blade 22 contacts the developing roller 21 so that a free end portion which is one end portion with respect to the widthwise direction is positioned upstream, with respect to the rotational direction of the developing roller 21, of a fixed end portion which is the other end portion with respect to the widthwise direction. The developing blade 22 regulates a coating amount of the toner supplied onto the developing roller 21 by the supplying roller 23 and imparts the electric charges to the toner. In this embodiment, the developing blade 22 is constituted by a plate-like member which is relatively thin (thin plate), and by utilizing spring elasticity of this thin plate, contact pressure to the developing roller 21 is generated. The developing blade 22 contacts the toner and the developing roller 21 at a surface thereof on the developing roller 21 side. In this embodiment, as the developing blade 22, a blade prepared by coating a semiconductor resin material on a 0.1 mm-thick leaf spring-shaped thin plate made of SUS (stainless steel) was used. Incidentally, the developing blade 22 is not limited to the developing blade in this embodiment, but a thin plate of metal such as phosphor bronze or aluminum in place of the SUS may be used. Further, in place of the semiconductor resin material, a semiconductor rubber or a thin metal plate which is not subjected to surface coating may also be used.

In this embodiment, during the development, to the developing blade 22, a predetermined regulating member voltage (regulating member bias) which is the DC voltage of the same polarity (the negative polarity in this embodiment) as the normal charge polarity of the toner is applied by a regulating member voltage applying portion (not shown). By this, negative electric charges are imparted to the toner due to electric discharge between the developing blade 22 and the developing roller 21 and triboelectric charge by friction between the developing blade 22 and the developing roller 21. Further, at the same time, a layer thickness of the toner on the developing roller 21 is regulated by the developing blade 22. In this embodiment, during the development, the regulating member voltage is applied to the developing blade 22 by the regulating member voltage applying portion so that a potential difference obtained by subtracting a potential of the developing blade 22 from a potential of the developing roller 21 becomes −100 V. That is, during the development, to the developing blade 22, the regulating member voltage which is the same polarity as the polarity of the developing voltage and which is larger in absolute value than the developing voltage is applied by the regulating member voltage applying portion.

The supply roller 23 is disposed in contact with the developing roller 21 and forms a predetermined nip between a surface (outer peripheral surface) thereof and a surface (outer peripheral surface) of the developing roller 21. The supplying roller 23 is rotated in a counterclockwise direction in FIG. 2. In this embodiment, the supplying roller 23 is an elastic sponge roller prepared by forming an elastic layer constituted by an elastic foam member on an outer peripheral surface of an electroconductive core metal. The supplying roller 23 and the developing roller 21 are in press-contact with each other with a predetermined penetration amount. Further, the supplying roller 23 and the developing roller 21 are rotated so as to be moved in the same direction as each other at a contact portion therebetween. In this embodiment, the supplying roller 23 is rotationally driven by the driving force branched and transmitted from the driving source for driving the photosensitive member 2. The supplying roller 23 supplies the toner to the developing roller 21 and scrapes off the toner, from the developing roller 21, remaining on the developing roller 21 after the development.

At that time, by adjusting a potential difference between the supplying roller 23 and the developing roller 21, a supplying amount of the toner to the developing roller 21 can be adjusted. In this embodiment, during the development, to the supplying roller 23, a predetermined supplying member voltage (supplying member bias) which is the DC voltage of the same polarity (the negative polarity in this embodiment) as the normal charge polarity of the toner is applied by a supplying member voltage applying portion (not shown). In this embodiment, during the development, the supplying member voltage is applied to the supplying member 23 by the supplying member voltage applying portion so that a potential difference obtained by subtracting a potential of the developing blade 22 from a potential of the supplying member 23 becomes −100 V. That is, during the development, to the supplying member 23, the supplying member voltage which is the same polarity as the polarity of the developing voltage and which is larger in absolute value than the developing voltage is applied by the supplying member voltage applying portion.

In this embodiment, the developing roller 21 is a roller prepared by forming an elastic layer constituted by an electroconductive rubber material around an electroconductive core metal. The toner accommodated in the accommodating chamber 24 is incorporated into a sponge portion of the supplying roller 23 and then is conveyed toward the developing roller 21. In this embodiment, each of the developing roller 21 and the supplying roller 23 are φ20 mm in outer diameter, and a penetration amount of the supplying roller 23 into the developing roller 21 is set at 1.5 mm. Further, the developing roller 21 and the photosensitive member 2 are rotated so as to be moved in the same direction at an opposing portion (contact portion) therebetween. In this embodiment, the developing roller 21 is rotationally driven by the driving force branched and transmitted from the driving source for driving the photosensitive member 2. In this embodiment, during the development, to the developing roller 21, the predetermined developing voltage (developing bias) which is the DC voltage of the same polarity (the negative polarity in this embodiment) as the normal charge polarity of the toner is applied by a developing voltage applying portion E2 (FIG. 3) (described later). In a developing nip (developing portion) which is the contact portion between the developing roller 21 and the photosensitive member 2, the toner negatively charged by a potential difference between the developing roller 21 and the photosensitive member 2 is transferred onto an image portion of the electrostatic latent image on the photosensitive member 2, so that the electrostatic latent image is developed. In this embodiment, during the development, to the developing roller 21, the developing voltage of −350 V is applied by the developing voltage applying portion E2.

The developing roller 21, the developing blade 22, and the supplying roller 23 constitute a developing member for forming the toner image by depositing the toner on the electrostatic latent image formed on the photosensitive member 2.

To the transfer roller 8, the predetermined transfer voltage (transfer bias) which is the DC voltage of the opposite polarity (the positive polarity in this embodiment) to the normal charge polarity of the toner is applied by the transfer voltage applying portion E3 (described later), so that the toner image on the photosensitive member 2 is transferred onto the recording material P. In the image forming apparatus 1 of this embodiment, by using a constant-current circuit (not shown), the transfer voltage is controlled (adjusted) so that a current supplied from the transfer voltage applying portion E3 (described later) to the transfer roller 8 becomes about 16 μA. In this embodiment, the transfer roller 8 having an electric resistance value of 7.8 LogΩwas used. The electric resistance value of the transfer roller 8 was measured in the following manner. That is, the transfer roller 8 was rotated at a peripheral speed of about 120 mm/see in a state in which the transfer roller 8 was press-contacted to an electrically grounded aluminum drum under a load of 400 gf, in an environment of a normal temperature/normal humidity (23° C./50% RH). Then, from a current value measured under application of a voltage of 2.0 kV to the core metal of the transfer roller 8, the electric resistance value was calculated.

Incidentally, constitutions and control voltage values of the above-described respective members are not limited to those described above, but may be appropriately changed (selected) when similar functions can be achieved.

Further, in this embodiment, the photosensitive member 2 and, as the process means actable on the photosensitive member 2, the charging roller 3, the developing device 5, and the cleaner 6 (integrally constitute a process cartridge 20 detachably mountable to the apparatus main assembly of the image forming apparatus 1.

Figure 3:
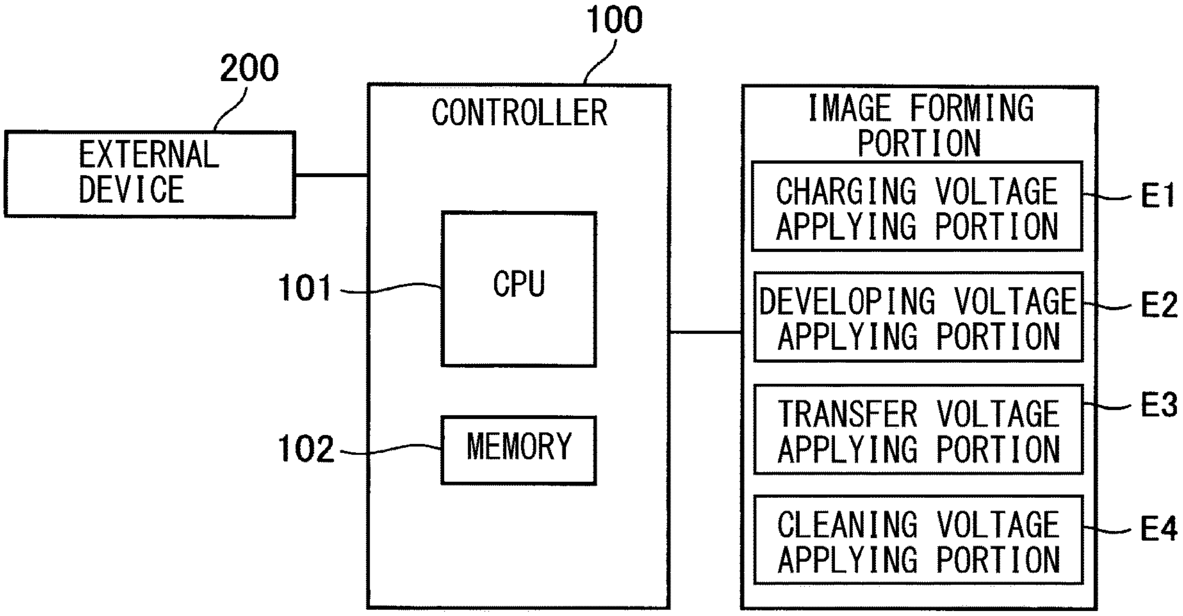
FIG. 3 is a schematic block diagram showing an operation mode of the image forming apparatus.

FIG. 3 is a schematic block diagram showing a control made of a principal part of the image forming apparatus 1 of this embodiment. The image forming apparatus 1 is provided with a controller 100 for controlling an operation of the image forming apparatus 1. The controller 100 is constituted by including a CPU 101 as a calculation (computation) control means which is a central element for performing arithmetic processing, a memory (storing medium) 102 such as a ROM or a RAM as a storing means, an input/output portion (not shown) for controlling transfer of signals between the controller 100 and the respective portions other than the controller 100, and the like. In the RAM which is a rewritable memory, information inputted to the controller 100, detected information, a calculation result, and the like are stored, and in the ROM, control programs, data tables acquired in advance, and the like are stored. The CPU 101 and the memory 102 such as the RAM or the ROM are capable of data transfer and reading therebetween. The controller 100 executes image formation by carrying out integrated control of the respective portions of the image forming apparatus 1. Further, as described later, the controller 100 is capable of carrying out control so that a cleaning operation for moving the toner from the transfer roller 8 to the photosensitive member 2 under application of the voltage of the same polarity as the normal charge polarity of the toner to the transfer roller 8 when the recording material P is not present in the transfer nip is executed.

The image forming apparatus 1 executes a print job (print, printing operation) which is a series of operations for forming and outputting the image (images) on a single or a plurality of recording materials P and which is started by a single starting instruction. The print operation includes in general an image forming step, a pre-rotation step, a sheet interval step in the case where the images are formed on the plurality of recording materials P, and a post-rotation step. The image forming step is a period in which formation of the electrostatic latent image for the image formed and outputted on the recording material P, formation of the toner image, and transfer of the toner image, and the like are carried out in actuality, and during image formation refers to this period. Specifically, a timing during image formation is different at each of the positions where the respective steps of the formation of the electrostatic latent image, the formation of the toner image, the transfer of the toner image, and the like are carried out, and corresponds to a period in which an image forming region on the photosensitive member 2 passes through an associated one of the above-described respective positions. The pre-rotation step is period from the input of the start instruction until the image is started to be formed in actuality, in which a preparation operation before the image forming step is performed. The sheet interval step (image interval step, recording material interval step) is a period corresponding to an interval between two recording P when the images are continuously formed on the plurality of recording material materials P (continuous printing, continuous image formation). The post-rotation step is period in which a post operation (preparatory operation) after the image forming step is performed. During non-image formation is a period other than during the image formation and includes the periods of the pre-rotation step, the sheet interval step, the post-rotation step, and in addition, during turning-on of a power source of the image forming apparatus 1, a pre-multi-rotation step which is a preparatory operation step during restoration from a sleep state, or the like. Specifically, a timing during the non-image formation corresponds to a period in which a non-image forming region on the photosensitive member 2 passes through the associated one of the respective positions where the steps of forming the electrostatic latent image, forming the toner image, and transferring the toner image are performed.

Incidentally, the image forming region on the photosensitive member 2 or the recording material P refers to a region which is defined in advance depending on a size of the recording material P and on which the toner image transferred onto the recording material P and then outputted from the image forming apparatus 1 is capable of being outputted, and the non-image forming region refers to a region other than the image forming region.

(2) Circuit Constitution

Figure 4:
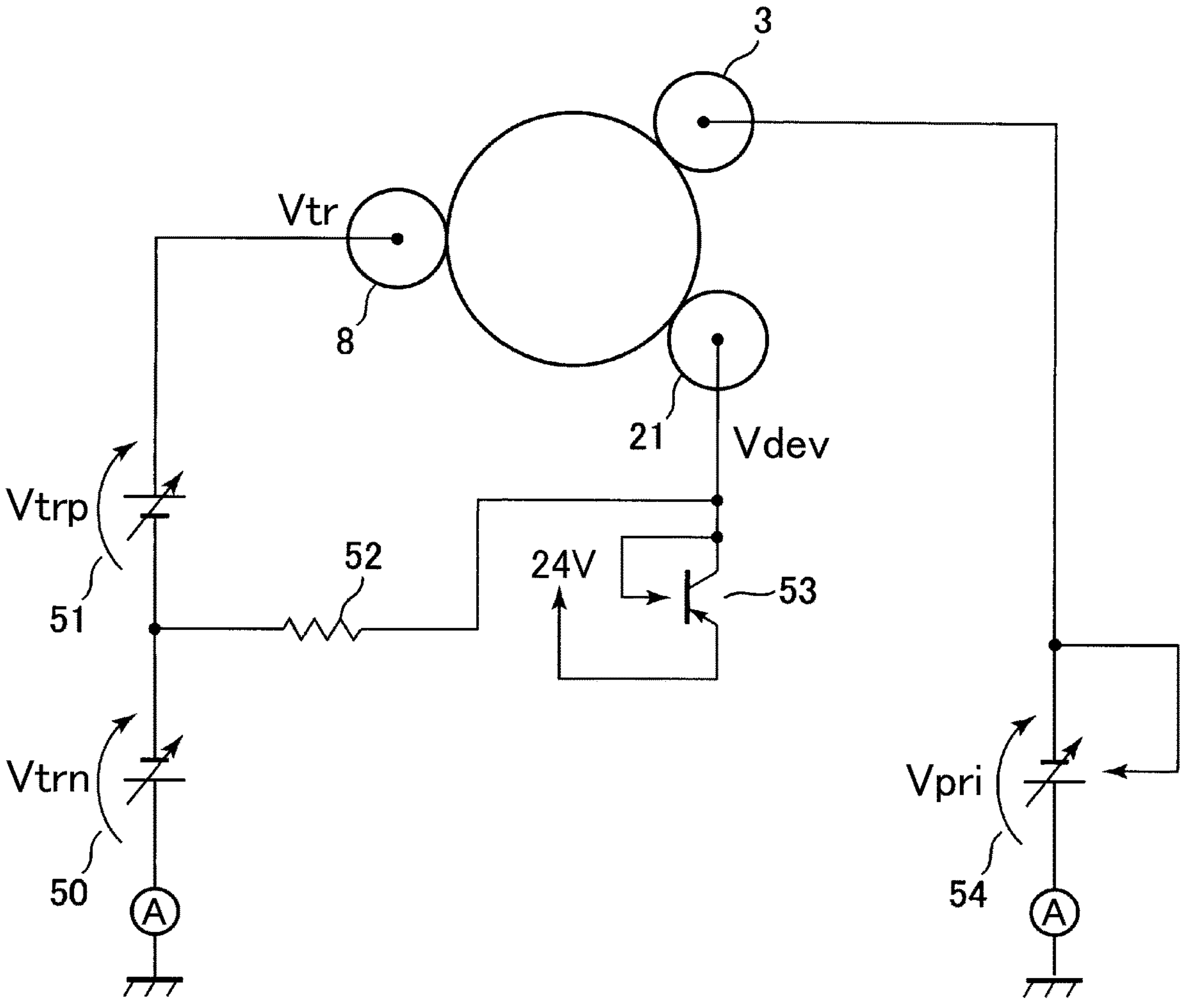
FIG. 4 is a schematic circuit view showing an example of a high-voltage circuit constitution of the image forming apparatus.

Next, a high-voltage circuit constitution in which the developing voltage and the cleaning voltage are outputted from a common power source in this embodiment will be described using FIG. 4. FIG. 4 is an illustration of the high-voltage circuit constitution in this embodiment.

First, by a first voltage boosting circuit (power source) 50 constituted by a transformer or the like, as a voltage of a first polarity, a negative transfer voltage (cleaning voltage) Vtrn (of the negative polarity) is generated. Further, by a second voltage boosting circuit (another power source) 51 constituted by a transformer or the like, as a voltage of a second polarity opposite to the first polarity, a positive transfer voltage (cleaning voltage) Vtrp (of the positive polarity) is generated. Further, during the image formation (during the transfer), to the transfer roller 8, a transfer voltage Vtr in a superimposed form of the negative transfer voltage (cleaning voltage) Vtrn and the positive transfer voltage (cleaning voltage) Vtrp is applied. A voltage applying portion (voltage applying means) for applying the cleaning voltage (negative transfer voltage) to the transfer roller 8 by using the first voltage boosting circuit 50 as a power source is referred to as a "cleaning voltage applying portion (or a second transfer voltage applying portion)" E4 (FIG. 3). Further, a voltage applying portion (voltage applying means) for applying the transfer voltage (positive transfer voltage) to the transfer roller 8 by using the second voltage boosting circuit 51 (and further the first voltage boosting circuit 50) as a power source is referred to as a "transfer voltage applying portion (or a first transfer voltage applying portion)" E3 (FIG. 3). Here, in this embodiment, in the first voltage boosting circuit 50, relatively inexpensive open-loop control is carried out. For that reason, the first voltage boosting circuit 50 has a characteristic such that an absolute value of the negative transfer voltage (cleaning voltage) Vtrn lowers with a heavier load.

A developing voltage Vdev is generated by dividing the negative transfer voltage (cleaning voltage) Vtrn of 24 V with a resistor 52 and a transistor 53. In this embodiment, in order to accurately control the developing voltage Vdev, conduction of the transistor 53 is controlled by feeding back the developing voltage Vdev. Here, as regards the high-voltage circuit constitution, the load of the first voltage boosting circuit 50 is heavier in the case where the transistor 53 is in an on state than in the case where the transistor 53 is in an off state. That is, in this embodiment, the absolute value of the negative transfer voltage (cleaning voltage) Vtrn becomes larger when an absolute value of the developing voltage Vdev is made larger, and becomes smaller when the absolute value of the developing voltage Vdev is made smaller. For that reason, in this embodiment, by adjusting the developing voltage Vdev, the negative transfer voltage (cleaning voltage) Vtrn can be changed. A voltage applying portion (voltage applying means) for applying the developing voltage to the developing roller 21 by using the first voltage boosting circuit 50 as a power source is referred to as a "developing voltage applying portion" E2.

Further, in this embodiment, a charging voltage Vpri is generated by an independent third voltage boosting circuit (further power source) 54. A voltage applying portion (voltage applying means) for applying the charging voltage to the charging roller 3 by using the third voltage boosting circuit 54 as a power source is referred to as a "charging voltage applying portion" E1.

Next, the reason why the developing voltage applying portion E2 is selected as the voltage applying portion using the power source common to itself and the cleaning voltage applying portion E4, i.e., the reason why the developing voltage is selected as the voltage supplied from the power source common to itself and the cleaning voltage will be described. As described above, in this embodiment, in the case where the cleaning voltage is changed, control in which an output voltage value of the voltage applying portion using the power source common to itself and the cleaning voltage applying portion E4, i.e., the developing voltage is changed is carried out. That is, in this embodiment, the cleaning voltage (negative transfer voltage) during the cleaning operation is controlled (adjusted) by changing the output voltage value of the voltage applying portion using the power source common to itself and the cleaning voltage applying portion E4. On the other hand, a principle of the cleaning operation is such that the toner deposited on the transfer roller 8 is electrostatically transferred onto the photosensitive member 2 by a potential difference between the potential (the cleaning voltage applied to the transfer roller 8) of the transfer roller 8 and the surface potential of the photosensitive member 2. Here, the case where the charging voltage applying portion E1 is selected as the voltage applying portion using the power source common to itself and the cleaning voltage applying portion E4 will be assumed.

In this case, when the cleaning voltage is changed during the cleaning operation, the charging voltage is changed. That is, in this case, not only the target cleaning voltage is changed, but also the charging voltage is changed. Further, when the charging voltage is changed, the surface potential of the photosensitive member 2 is changed. For that reason, the potential difference between the potential of the transfer roller 8 and the surface potential of the photosensitive member 2 is also changed. That is, during the cleaning operation, both the cleaning voltage and the surface potential of the photosensitive member 2 are changed. By this, in some cases, there is a possibility that the potential difference between the potential of the transfer roller 8 and the surface potential of the photosensitive member 2 does not become a desired potential difference and thus cleaning of the transfer roller 8 is not effectively performed and there is a need to take a relatively long time for the cleaning of the transfer roller 8. Therefore, in this embodiment, from a viewpoint of enabling stable cleaning of the transfer roller 8, as the voltage applying portion using the power source common to itself and the cleaning voltage applying portion E4, the developing voltage applying portion E2 is selected.

Figure 5:
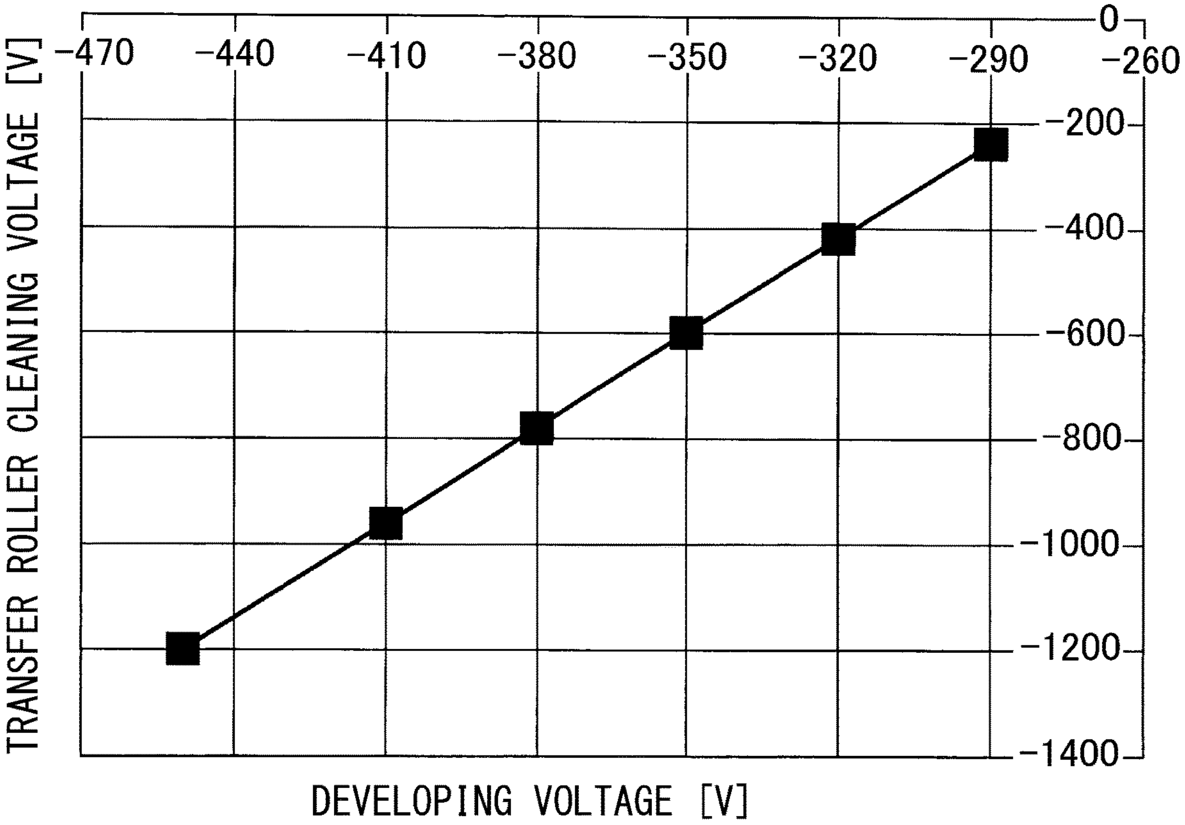
FIG. 5 is a graph showing an example of a relationship between a cleaning voltage and a developing voltage.

Using FIG. 5, a relationship between the developing voltage and the cleaning voltage in this embodiment will be described. FIG. 5 is a graph showing the relationship between the developing voltage and the cleaning voltage in this embodiment. As described above, in this embodiment, it is possible to change the cleaning voltage by adjusting the developing voltage. As is understood from FIG. 5, in this embodiment, in the case where the developing voltage is set at, for example, −350 V which is the developing voltage during the image formation (during the development), the cleaning voltage of about −600 V is applied to the transfer roller 8. Further, when the developing voltage is changed to −380 V, for example, during the cleaning operation, the cleaning voltage of about −780 V which is more advantageous for the cleaning of the transfer roller 8 is applied to the transfer roller 8.

Incidentally, the high-voltage circuit constitution usable in this embodiment is not limited to the high-voltage contact constitution shown in FIG. 4, but can be appropriately changed when a circuit having a similar function is employed. Further, the relationship between the developing voltage and the cleaning voltage is not limited to the relationship shown in FIG. 5, but can be changed depending on electric resistance values of the respective members on the circuit, a performance of the voltage boosting circuit, or the like.

(3) Fog Toner and Set Value of Developing Voltage

Next, a relationship between the fog toner and a set value of the developing voltage in this embodiment will be described.

First, the fog toner will be described. The "fog toner" refers to toner transferred from the developing device 5 onto the dark-portion potential Vd portion of the photosensitive member 2. As an occurrence factor of the fog toner, it is possible to cite the following factors. For example, it is possible to cite that a charge amount of a part of the toner lowers by triboelectric charge due to friction of the toner on the developing roller 21 with the photosensitive member 2 and that the charge polarity shifts toward the opposite polarity (the positive polarity in this embodiment) side to the normal charge polarity side. Further, for example, it is possible to cite the case where the toner in the accommodating chamber 24 deteriorates with consumption of the developing device 5 and a toner charging property lowers, and thus a normal charge amount of the toner cannot be maintained on the developing roller 21 and the toner is charged to the opposite polarity (the positive polarity in this embodiment) to the normal charge polarity. Thus, when (1) the toner lowered in charging amount and (2) the toner charged to the opposite polarity to the normal charge polarity are present, this is liable to cause the fog toner.

Next, a mechanism in which (1) the toner lowered in charging amount and (2) the toner charged to the opposite polarity to the normal charge polarity are transferred as the fog toner onto the dark-portion potential Vd portion of the photosensitive member 2 will be described in association with a set value of the developing voltage.

In this embodiment, during the image formation, the developing voltage is set at −350 V, and the dark-portion potential Vd is set at −500 V. Further, in this embodiment, the normal charge polarity of the toner present on the developing roller 21 is the negative polarity. For that reason, the toner having the normal charge polarity and the normal charge amount is electrostatically attracted to the developing roller 21 side by the influence of an electric field between the developing roller 21 and the photosensitive member 2 in the developing nip. By this influence, when the toner having the normal charge polarity and the normal charge amount is used, transfer of the toner onto the dark-portion potential Vd portion of the photosensitive member 2 does not occur or an occurrence amount thereof is very small even when such transfer occurs.

On the other hand, (1) the toner lowered in charge amount is relatively smaller in force for electrostatically attracting the toner toward the developing roller 21 side as described above than the above-described toner having the normal charge polarity and the normal charge amount. In such a condition, for example, when the absolute value of the developing voltage is made large such as −400 V, the force for electrostatically attracting the toner toward the developing roller 21 side as described above further lowers. In this case, a part of the toner on the developing roller 21 is peeled off from the developing roller 21 toward the photosensitive member 2 side due to physical friction with the photosensitive member 2, with the result that the part of the toner is transferred onto the photosensitive member 2 in some instances. Further, there is tendency that this transfer amount (an occurrence amount of the fog toner on the photosensitive member 2) becomes larger with a larger absolute value of the developing voltage. Thus, the fog toner generating in the case where the absolute value of the developing voltage is made large is referred to as "ground fog toner".

Further, (2) the toner charged to the opposite polarity to the normal charge polarity is influenced by the electric field between the developing roller 21 and the photosensitive member 2, and the force for electrostatically attracting the toner toward the photosensitive member 2 side acts on this toner. Further, for example, when the absolute value of the developing voltage is made small such as −300 V, the force for attracting the toner toward the photosensitive member 2 side as described above by an electrostatic force increases. When this electrostatic force increases to an extent such that the electrostatic force overcomes a non-electrostatic force generating between the toner and the developing roller 21, the toner is transferred as the fog toner onto the photosensitive member 2. Further, there is tendency that this transfer amount (an occurrence amount of the fog toner on the photosensitive member 2) becomes larger with a smaller absolute value of the developing voltage. Thus, the fog toner generating in the case where the absolute value of the developing voltage is made small is referred to as "reverse fog toner".

Figure 6:
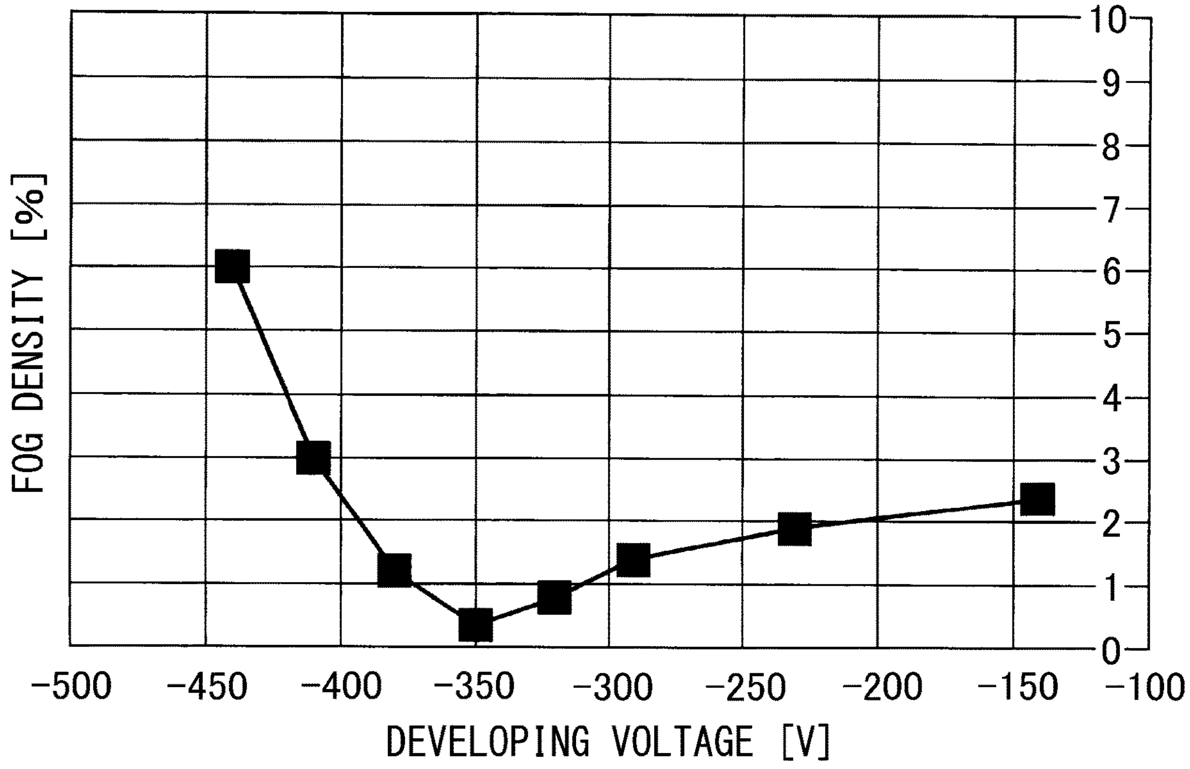
FIG. 6 is a graph showing an example of a relationship between the developing voltage and a fog toner amount.

FIG. 6 is a graph showing a relationship between the set value of the developing voltage and a transfer amount of the fog toner onto the photosensitive member 2 (hereinafter, simply referred to as a "fog toner amount") in the case where the dark-portion potential Vd is fixed to −500 V in the image forming apparatus 1 in the constitution of this embodiment.

Here, the fog toner amount was measured in the following procedure. First, a solid white image where the electrostatic latent image is not formed is selected as an image to be printed, and then the image forming operation is started. Then, before the recording material P reaches the transfer nip N, rotation of the photosensitive member 2 is stopped, and a state in which the fog toner remains on the photosensitive member 2 was caused. Then, the fog toner present on the photosensitive member 2 was deposited on an adhesive tape (Scotch mending tape, manufactured by Sumitomo 3M Limited). The adhesive tape on which the fog toner was deposited was applied onto a white background sheet ("GF-C081" (trade name), manufactured by Canon K.K.). Further, for comparison, an adhesive tape on which the fog toner was not deposited was applied onto the same sheet. Then, by using a "REFLECTMETER MODEL TC-6DS" (manufactured by Tokyo Denshoku CO., LTD.), whiteness (reflectance D1 (%)) of the adhesive tape portion where the fog toner was deposited and whiteness (reflectance D2 (%)) of the adhesive tape portion where the fog toner was not deposited were measured. Then, from a difference therebetween, a fog density (%) (=D2(%) −D1(%)) was calculated. By this fog density (%), a fog toner amount can be represented.

From FIG. 6, in the case where the absolute value of the developing voltage is increased from −350 V which is the set value during the image formation, it is understood that the fog toner amount increases. Incidentally, the fog toner on this condition corresponds to the above-described "ground fog toner". Further, from FIG. 6, also, in the case where the absolute value of the developing voltage is decreased from −350 V which is the set value during the image formation, it is understood that the fog toner amount increases. Incidentally, the fog toner on this condition corresponds to the above-described "reverse fog toner".

Incidentally, in this embodiment, the fog toner amount on the condition such that the fog toner does not readily occur, i.e., in an initial stage of durability in which toner deterioration does not readily proceed, was described using FIG. 6. A constitution in which the fog toner amount after the durability in which the toner deterioration proceeded is assumed will be described later in another embodiment described later. Here, the "initial stage of durability" or "undurability" means an initial stage of a lifetime period of the developing device 5 (the toner in the accommodating chamber 24) or a fresh (new) state and specifically corresponds to an initial stage or before a start of a durability test as described later. Further, "after durability" means a last stage of the lifetime period of the developing device 5 (the toner in the accommodating chamber 24) or a lifetime-end state and specifically corresponds to a last stage or after an end of the durability test as described later.

(4) Cleaning Operation

Figure 7:
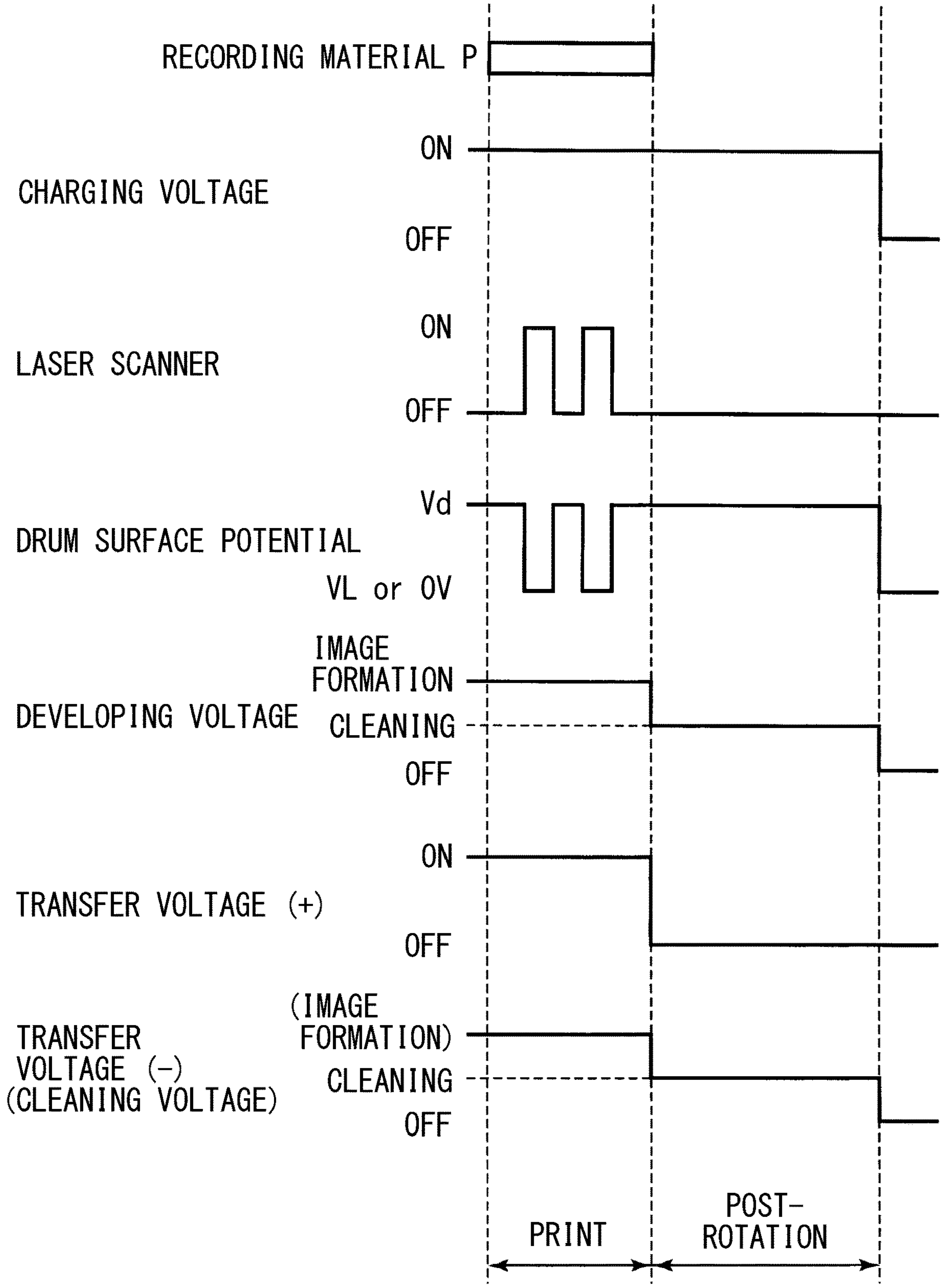
FIG. 7 is a timing chart for illustrating an example of a cleaning operation.

Next, using FIG. 7, the cleaning operation in this embodiment will be further described. In this embodiment, the image forming apparatus 1 executes the cleaning operation at a timing after a final recording material P of a single print job passes through the transfer nip N, i.e., after an end of transfer (image formation) of the toner image from the photosensitive member 2 onto the recording material P. Incidentally, in this embodiment, the image forming apparatus 1 is constituted so as to form the developing nip in contact between the photosensitive member 2 and the developing roller 21 at all times.

FIG. 7 is a timing chart showing an operation state of each of the respective portions in timings of the formation (printing) of the image on the final recording material P in the single print job and of the post-rotation after the image formation. In this embodiment, the controller 100 executes control of an operation of the print job in accordance with the timing chart shown in FIG. 7. In FIG. 7, states of the charging voltage, light emission of the laser scanner 4, the state potential of the photosensitive member 2, the developing voltage, the positive transfer voltage, and the negative transfer voltage (cleaning voltage) are shown. Incidentally, as regards the developing voltage and the negative transfer voltage (cleaning voltage), the set value during the image formation was represented by "IMAGE FORMATION" (for image formation), and the set value during the cleaning operation was represented by "CLEANING" (for cleaning).

First, the operations of the respective portions will be described. During the image formation, the charging voltage is applied ("ON"), so that the surface of the photosensitive member 2 is charged to the dark-portion potential Vd. Further, "ON/OFF" of the light emission of the laser scanner 4 is carried out depending on the image information, so that the electrostatic latent image is formed on the photosensitive member 2. By this, on the surface of the photosensitive member 2, the light-portion potential VL is partially formed. To the developing roller 21, the developing voltage Vdev for the image formation is applied, so that the toner image is formed on the photosensitive member 2. To the transfer roller 8, the transfer voltage Vtr in the superimposed form of the positive transfer voltage Vtrp and the negative transfer voltage Vtrn for the image formation is applied, so that the toner image on the photosensitive member 2 is transferred onto the recording material P. The polarity of the transfer voltage Vtr is the opposite polarity (the positive polarity in this embodiment) to the normal charge polarity of the toner. That is, in this embodiment, the developing voltage Vdev and the negative transfer voltage Vtrn are outputted from the first voltage boosting circuit 50 which is the power source common to these voltages. For that reason, during the image formation, to the transfer roller 8, the transfer voltage Vtr in the superimposed form of the positive transfer voltage Vtrp and the negative transfer voltage Vtrn for image formation is applied. In this embodiment, the transfer voltage Vtr is subjected to constant-current control, and a target current value thereof is 16 μA. During the image formation, as the positive transfer voltage Vtrp, a positive polarity-voltage large in absolute value by the negative transfer voltage Vtrn is applied. In this embodiment, the controller 100 carries out control so as to execute the constant-current control of the transfer voltage Vtr by adjusting the positive transfer voltage outputted by the second voltage boosting circuit 51 so that a current which is detected by a current detecting circuit as a current detecting means and which flows through the transfer roller 8 approaches a target current value.

Next, the operations of the respective portions during the cleaning operation executed during the post-rotation will be described. As described above, in this embodiment, by changing the developing voltage, the cleaning voltage can also be changed in a subordinate form. During the post-rotation, the developing voltage Vdev is changed from the set value for the image formation to the set value for the cleaning. Then, the positive transfer voltage Vtrp is turned off ("OFF"). This operation aims at contacting the negative transfer voltage (cleaning voltage) Vtrn to the set value for the cleaning at which the cleaning of the transfer roller 8 is effectively performed. That is, the toner deposited on the transfer roller 8 is charged to the negative polarity which is the normal charge polarity in many instances. Therefore, by applying, to the transfer roller 8, a cleaning voltage having the negative polarity and a large absolute value, a strong electrostatic force is caused to act on the toner deposited on the transfer roller 8, so that it becomes possible that transfer of the toner, deposited on the transfer roller 8, onto the recording material 2 is promoted. Then, during the post-rotation, for a certain time, the cleaning operation (application of the cleaning voltage to the transfer roller 8) is executed, and thereafter, the operation (rotation of the rotatable member, application of the voltage) of the image forming apparatus 1 is ended.

Here, in this embodiment, the reason why the charging voltage is turned on ("ON") even during the post-rotation will be described. In a state in which the charging voltage is not applied to the charging roller 3, when the developing voltage is applied to the developing roller 21, a state in which the potential of the developing roller 21 is larger than the surface potential of the photosensitive member 2 on the normal charge polarity (the negative polarity in this embodiment) side of the toner. In this state, the toner on the developing roller 21 is electrostatically transferred onto the photosensitive member 2 by the influence of the electric field between the developing roller 21 and the photosensitive member 2. In this case, unnecessary toner is used. Further, in this case, a part of the toner on the photosensitive member 2 is transferred onto the transfer roller 8, so that the transfer roller 8 is contaminated with the toner. For the purpose of suppressing such a situation, in this embodiment, the charging voltage is kept "ON" even during the post-rotation.

In this embodiment, during the post-rotation, the cleaning operation (application of the cleaning voltage to the transfer roller 8) is executed for about 0.6 sec corresponding to four-full circumferences (turns) of the transfer roller 8, and thereafter, the operation (rotation of the rotatable member, application of the voltage) of the image forming apparatus 1 is ended. The set voltage of the cleaning voltage in this embodiment will be described in the subsequent item (5).

Incidentally, in this embodiment, the cleaning operation was executed during the post-rotation, but the present invention is not limited thereto. The cleaning operation can be executed at an arbitrary timing when the timing is during the non-image formation. That is, the cleaning operation may be executed, for example, during the pre-rotation before the image formation is started or in the sheet interval or the like in which the recording material P is not present in the transfer nip N during continuous printing. Further, for example, after the recording material P is jammed or the like, deposition of contaminant toner on the transfer roller 8 is predicted or detected, and then the cleaning operation may be executed.

(5) Image Current Experiment Result

In this embodiment, during the non-image formation (specifically, a timing when both the developing position and the transfer position are those during the non-image formation), the set value of the developing voltage is changed from the set value during the image formation (during the development), so that the cleaning voltage is controlled (adjusted) to the set value suitable for the cleaning of the transfer roller 8. At this time, depending on the set value of the cleaning voltage, a cleaning performance for the transfer roller 8 is influenced. Further, as described above, depending on the set value of the developing voltage, the fog toner amount is changed. For that reason, in consideration of both the cleaning performance for the transfer roller 8 and the fog toner amount during the cleaning operation, it is desired that the developing voltage is adjusted.

Figure 8:
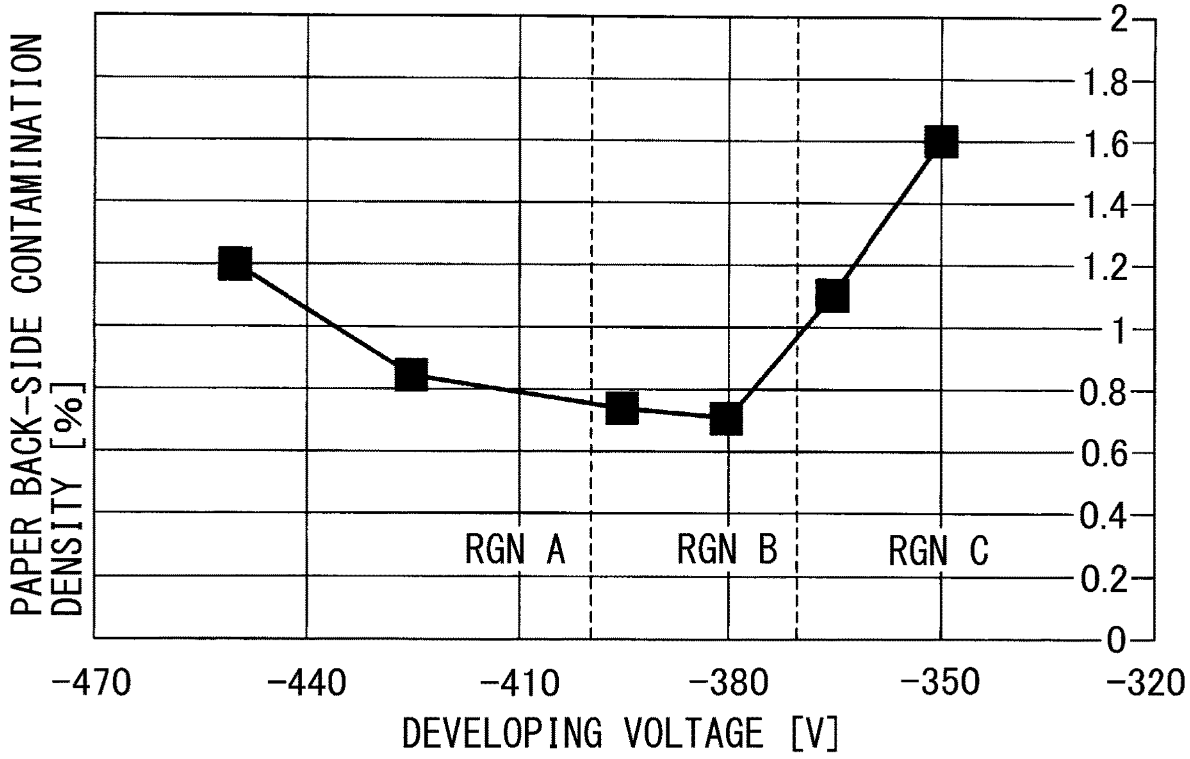
FIG. 8 is a graph showing an example of a relationship between the developing voltage and a cleaning performance.

First, by using FIG. 8, a relationship between the developing voltage and the cleaning performance for (cleaning) the transfer roller 8 will be described. FIG. 8 is a graph showing a result of an experiment of the cleaning performance when the developing voltage (and the cleaning voltage) during the cleaning operation is changed in the image forming apparatus 1 in the constitution of this embodiment.

The experiment was conducted by being divided into two consisting of "preliminary sheet (paper) passing" in which the toner contamination is deposited on the transfer roller 8 and "sheet (paper) back-side contamination sheet passing" for evaluating sheet back-side contamination after the cleaning operation is executed.

The preliminary sheet passing was conducted on the following condition. The cleaning operation capable of being executable in the sheet interval or the like was not performed, and one-side continuous printing of solid white images on 1000 sheets is carried out, so that the toner contaminant was deposited on the transfer roller 8. The cleaning operation was executed only once during the post-rotation after the end of the continuous printing, and then the operation of the image forming apparatus 1 was ended. Further, the developing voltage during the cleaning operation was changed from −350 V, which is smallest in ground fog toner amount, in a direction of increasing the absolute value of the developing voltage at levels shown in FIG. 8.

The sheet back-side contamination evaluation sheet passing was carried out on the following condition. After the above-described preliminary sheet passing was carried out, during the pre-rotation, one-side printing of the solid white image on a single sheet was carried out without performing the executable cleaning operation, and then a degree of sheet back-side contamination (paper back contamination) was measured. The measurement of the paper back contamination was made in the following manner. For measurement, the "REFLECTMETER MODEL TC-6DS" (manufactured by Tokyo Denshoku CO., LTD.) was used. The whiteness (reflectance D1(%)) of a portion where the paper back contamination occurred and the whiteness (reflectance D2(%)) of a portion where the paper back contamination did not occur were measured. Then, from a difference therebetween, a paper back contamination density (%) (=D2(%)−D1(%)) was calculated. By this paper back contamination density (%), the degree of the paper back contamination can be represented. Further, as regards the degree of the paper back contamination, discrimination through eye observation was also made.

As a condition common to the preliminary sheet passing and the paper back contamination evaluation sheet passing, the experiment was conducted under a normal temperature/humidity condition (under a normal temperature/normal humidity (23° C./50% RH) environment as an example), and as the recording material P, "GF-0081" (A4-size paper, manufactured by Canon K.K., trade name).

From a result of FIG. 8, it is understood that the degree of the paper back contamination is improved in the case where the developing voltage is about −380 V. Further, from the result of FIG. 8, in the constitution of this embodiment, it is understood that there is a tendency that the degree of the paper back contamination becomes somewhat worse on a condition that the absolute value of the developing voltage is made larger than about −400 V and on a condition that the absolute value of the developing voltage is made smaller than about −360 V. Correspondingly to these three types of the conditions, a region where the absolute value of the developing voltage is about −380 V is referred to as a region B. A region where the absolute value of the developing voltage is larger than −400 V is referred to as a region A. Further, a region where the absolute value of the developing voltage is smaller than −360 V is referred to as a region C.

In the region C, the developing voltage relatively small in absolute value is applied to the developing roller 21. As described above using FIG. 5, in the constitution of this embodiment, on the condition that the absolute value of the developing voltage is small, there is a tendency that the absolute value of the cleaning voltage becomes small. For this reason, the cleaning voltage enough to remove the toner deposited on the transfer roller 8 by the preliminary sheet passing was not applied to the transfer roller 8 during the cleaning operation, so that the toner remaining on the transfer roller 8 appeared as the paper back contamination during the paper back contamination evaluation sheet passing.

On the other hand, in the region A, the developing voltage relatively large in absolute value is applied to the developing roller 21. For that reason, during the cleaning operation, the cleaning voltage large in absolute value which is advantageous for cleaning the transfer roller 8 is applied to the transfer roller 8. However, as described above using FIG. 6, the condition that the developing voltage relatively large in absolute value is applied to the developing roller 21 is also a condition that the ground fog toner is liable to be transferred onto the recording material P. For that reason, the ground fog toner generated on the photosensitive member 2 during the cleaning operation was transferred onto the transfer roller 8 principally by a physical depositing force, and appeared as the paper back contamination during the subsequent paper back contamination evaluation sheet passing.

On the contrary, in the region B, similarly as in the region C, the fog toner on the photosensitive member 2 is relatively small, and the cleaning voltage relatively large in absolute value similarly as in the region A is applied to the transfer roller 8. For that reason, the region B can be said as being on a condition effective in the paper back contamination from the viewpoints of both the transfer of the fog toner to the transfer roller 8 and the removal of the toner deposited on the transfer roller 8.

Based on the above-described evaluation results, in a table 1 below, a performance evaluation result for the paper back contamination in each of the constitution of this embodiment (embodiment 1), constitutions of comparison examples 1 and 2, and a constitution of a conventional example is shown. As shown in the table 1, the constitutions and operations of image forming apparatuses 1 in the embodiment 1 (this embodiment), the comparison examples 1 and 2, and the conventional example are substantially the same except that a power source structure and control voltage values are different as shown in the table 1.

TABLE 1

| | | SETTING*[2] | | | |
|---|---|---|---|---|---|
| | PSC*[1] | DV*[3] (V) | TRCV*[4] (V) | PBC*[5] [%] | DEGREE OF PBC*[5] |
| EMB. 1 | YES | −380 | −800 | 0.7 | GOOD |
| COMP. EX. 1 | YES | −350 | −600 | 1.6 | SC*[6] |
| COMP. EX. 2 | YES | −450 | −1200 | 1.2 | SC*[6] |
| CONV. EX. | NO | −350 | −1200 | 0.6 | GOOD |

*[1]"PSC" is power source commonality.
*[2]"SETTING" is voltage setting during cleaning of the transfer roller.
*[3]"DV" is the developing voltage.
*[4]"TRCV" is the transfer roller cleaning voltage.
*[5]"PBC" is the paper back contamination.
*[6]"SC" is somewhat conspicuous.

First, the result of this embodiment (embodiment 1) will be described. In this embodiment, the cleaning voltage and the developing voltage are outputted from a common power source (common to these voltages). The developing voltage during the image formation is set at −350 V. Further, the developing voltage during the cleaning operation is set at −380 V, with the result that the cleaning voltage is set at −800 V. On this condition, when the preliminary sheet passing the paper back contamination evaluation sheet passing were performed, the paper back contamination density was 0.7%, and a degree of the paper back contamination by eye observation discrimination was "good".

Next, the result of the comparison example 1 will be described. The comparison example 1 is similar to this embodiment in that the cleaning voltage and the developing voltage are outputted from the common power source and in that the developing voltage during the image formation is set at −350 V. However, the comparison example 1 is different from this embodiment in that the developing voltage during the cleaning operation is set at −350 V and is not changed from the developing voltage during the image formation. On this condition, the cleaning voltage is set at −600 V, and only the cleaning voltage relatively small in absolute value is outputted, and therefore, with the result that the cleaning performance for the transfer roller 8 was inferior to that in this embodiment. In this case, the paper back contamination density was 1.6%, and the degree of the paper back contamination by eye observation discrimination was a "somewhat conspicuous" result.

Next, the result of the comparison example 2 will be described. The comparison example 2 is similar to this embodiment in that the cleaning voltage and the developing voltage are outputted from the common power source and in that the developing voltage during the image formation is set at −350 V. However, the comparison example 2 is different from this embodiment in that the developing voltage during the cleaning operation is set at −450 V. On this condition, the cleaning voltage is set at −1200 V, and the cleaning voltage relatively large in absolute value can be outputted, but the amount of the fog toner generating during the cleaning operation became large. As a result, the paper back contamination density was 1.2%, and the degree of the paper back contamination by eye observation discrimination was the "somewhat conspicuous" result.

Next, the result of the conventional example will be described. The constitution of the conventional example is such that the power source is not common to the cleaning voltage and the developing voltage. In this constitution, each of the cleaning voltage and the developing voltage during the cleaning operation can be set at an arbitrary voltage. For that reason, the developing voltage during the cleaning operation is set at −350 v which is most advantageous for decreasing the fog toner amount. Further, the cleaning voltage is set at 1200 V at which a sufficient cleaning performance in the cleaning of the transfer roller 8 can be achieved. On this condition, the paper back contamination density was 0.6%. Further, the degree of the paper back contamination by eye observation discrimination was "good". Here, when the result of this embodiment and the result of the conventional example were compared with each other, although there was a somewhat difference in paper back contamination density, there was no difference in degree of the paper back contamination by eye observation discrimination, and the degree of the paper back contamination was "good" in either of this embodiment and the conventional example. From this, according to this embodiment, it is understood that the sufficient cleaning performance for the transfer roller 8 can be achieved.

Thus, the image forming apparatus 1 of this embodiment includes the rotatable recording material 2, the charging member 3 for charging the surface of the photosensitive member 2, the exposure device 4 for forming the electrostatic latent image on the surface of the photosensitive member 2 by exposing the charged surface of the photosensitive member 2 to light, the developing member 21 for forming the toner image by depositing the toner on the electrostatic latent image, the developing voltage applying portion E2 for applying the developing voltage to the developing member 21, the transfer member 8 for transferring the toner image from the surface of the photosensitive member 2 onto the recording material P passing through the transfer portion N, the first transfer voltage above-described E3 for applying, to the transfer member 8, the transfer voltage of the opposite polarity to the normal charge polarity of the toner, the second transfer voltage applying portion E4 for applying, to the transfer member 8, the transfer voltage of the same polarity as the normal charge polarity of the toner, the common power source 50 for supplying the voltages to the developing voltage applying portion E2 and the second transfer voltage applying portion E4, and the controller 100 capable of controlling the common power source 50, and the controller 100 carries out control so as to execute the image forming operation for forming the toner image on the recording material P and the non-image forming operation different from the image forming operation, and controls the common power source 50 in the non-image forming operation. In this embodiment, the controller 100 carries out control so as to execute, as the non-image forming operation, the cleaning operation for moving the toner from the transfer member 8 to the photosensitive member 2 under application of the above-described voltage of the same polarity to the transfer member 8 by the second transfer voltage applying portion E4 when the recording material P is not present in the transfer portion N. Further, in this embodiment, the controller 100 controls the change in output of the common power source 50 so that the value of the voltage applied to the developing member 21 by the developing voltage applying portion E2 during the cleaning operation is made different from the value of the voltage applied to the developing member 21 by the developing voltage applying portion E2 during the toner image formation. Further, in this embodiment, the controller 100 controls the above-described change so that the absolute value of the voltage applied to the transfer member 8 by the second transfer voltage applying portion E4 becomes larger, during the cleaning operation than in the case where the above-described change is not made. Further, in this embodiment, to the first transfer voltage applying portion E3, when the voltage of the above-described opposite polarity is applied to the transfer member 8, the voltage in the superimposed form of the voltage of the same polarity outputted from the common power source 50 and the voltage of the opposite polarity outputted from another power source 51.

As described above, in this embodiment, the power source is common to the cleaning voltage and the developing voltage, and the cleaning voltage is controlled (adjusted) by changing the set value of the developing voltage during the cleaning operation from the set value of the developing voltage during the image formation. Further, according to this embodiment, it is possible to achieve the cleaning performance for the transfer roller 8 to the same degree as the conventional constitution in which the commonality of the power source is not achieved between the cleaning voltage and the developing voltage. Further, in this embodiment, the commonality of the power source is achieved between the cleaning voltage and the developing voltage, and therefore, compared with the conventional constitution, the number of high-voltage power sources is decreased, with the result that it becomes possible to realize the downsizing and the cost reduction of the image forming apparatus 1. Thus, according to this embodiment, it becomes possible to perform stable cleaning of the transfer member 8 while realizing the downsizing and the cost reduction of the image forming apparatus 1 as a constitution in which an individual power source for cleaning the transfer member is not provided. That is, according to this embodiment, the individual power source for applying the voltage of the same polarity as the normal charge polarity of the toner to the transfer member 8 is not provided, so that the voltage of the same polarity as the normal charge polarity of the toner can be effectively applied to the transfer member 8 while realizing the downsizing and the cost reduction of the image forming apparatus 1.

Next, another embodiment (embodiment 2) of the present invention will be described. Basic constitution and operation of an image forming apparatus of this embodiment are the same as those in the embodiment 1. Accordingly, in the image forming apparatus of this embodiment, elements having the same or corresponding functions or constitutions to those of the image forming apparatus in the embodiment 1 will be omitted from detailed description by adding the same reference numeral or symbols as those in the embodiment 1.

The constitution of the embodiment 1 was such that a product of the image forming apparatus 1 in which a product lifetime is relatively short and a product of the image forming apparatus 1 in which a use environment is a normal temperature/humidity condition (a normal temperature/normal humidity (23° C./50% RH) environment as an example) are assumed. That is, the constitution of the embodiment 1 was such that a condition relatively small in fog toner amount is assumed. On the other hand, this embodiment is different from the embodiment 1 in that this embodiment meets with a condition relatively large in fog toner amount.

Here, in the embodiment 1, the image forming apparatus 1 was constituted so that the photosensitive member 2 and the developing roller 21 was always in contact with each other and formed the developing nip. On the other hand, in this embodiment, the image forming apparatus 1 is constituted so that the photosensitive member 2 and the developing roller 21 can be mechanically separated from each other in order to meet with the condition relatively large in fog toner amount. Further, in this embodiment, the image forming apparatus 1 performs the cleaning of the transfer roller 8 (application of the cleaning voltage to the transfer roller 8) in a state in which the developing roller 21 is separated from the photosensitive member 2.

Figure 9:
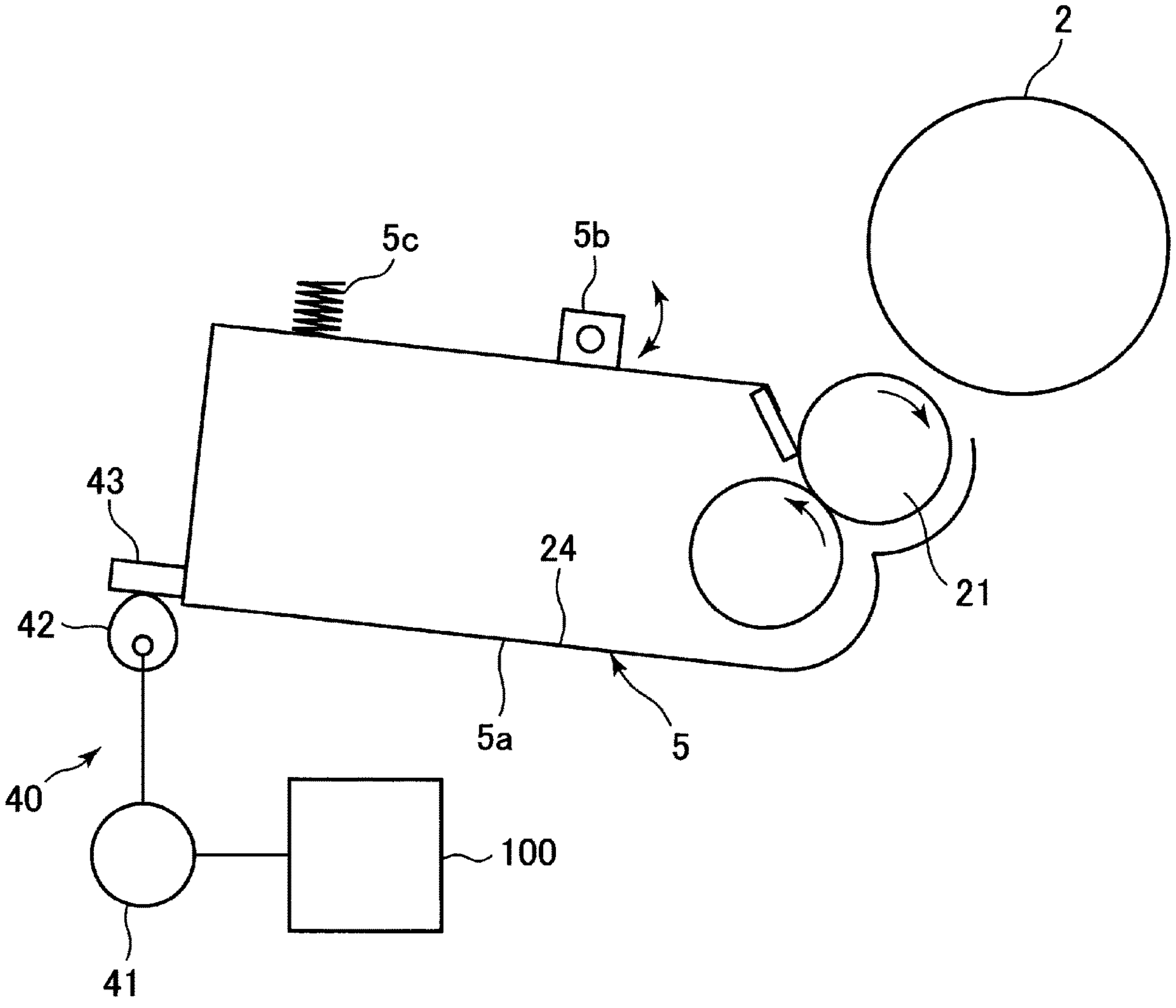
FIG. 9 is a schematic view of a separating mechanism.

FIG. 9 is a schematic view for illustrating a separating mechanism 40 in this embodiment. In this embodiment, the separating mechanism 40 capable of mechanically separating the photosensitive member 2 and developing roller 21 from each other is provided. The separating mechanism 40 is capable of switching a state in which the photosensitive member 2 and the developing roller 21 are in contact with each other (hereinafter, referred to a paperback "development contact state") and a non-contact state in which the photosensitive member 2 and the developing roller 21 are separated from each other (hereinafter, referred to as a "development separation state"). In this embodiment, the separating mechanism 40 has the following constitution. A developing container 5*a* constituting the accommodating chamber 24 of the developing device 5 is fixed, to another container (frame) supporting the photosensitive member 2 and the charging roller 3, so as to be rotatable (swingable) about a rotation shaft 5*b* provided substantially parallel to a rotational axis direction of the photosensitive member 2. Further, the developing container 5*a* is urged by an urging member 5*c* such as a spring so that the developing roller 21 rotatably supported by the developing container 5*a* is rotated in a direction in which the developing roller 21 contacts the photosensitive member 2. Further, the separating mechanism 40 includes a separating motor 41 as a driving source, a moving member (cam or the like) 42 driven by the separating motor 41, and a receiving portion 43, provided on the developing container 5*a*, for receiving action thereon by the moving member 42. A rotational operation of the separating motor 41 is controlled by the controller 100, so that urging by the moving member 42 toward the receiving portion 43 and release of the urging are performed. By urging the receiving portion 43 by the moving member 42, the developing container 5*a* is rotated against an urging force of the urging member 5*c*, so that the developing device 5 can be disposed in a separated position (development separation state) where the developing roller 21 is separated from the photosensitive member 2. Further, the urging of the receiving portion 43 by the moving member 42 is released, whereby the rotation of the developing container 5*a* is permitted by the urging force by the urging member 5*c*, and thus the developing device 5 can be disposed in a contact position (development contact state) where the developing roller 21 contacts the photosensitive member 2. In this embodiment, the separating mechanism 40 roughly causes the developing roller 21 to contact the photosensitive member 2 during the development. Further, in this embodiment, the separating mechanism 40 causes the developing roller 21 to be separated from the photosensitive member 2 during the cleaning operation. Further, the separating mechanism 40 may cause the developing roller 21 to be separated from the photosensitive member 2 during a stop of (drive of) the image forming apparatus 1 (during a stand-by state in which the image forming apparatus 1 waits for the print job or during a power source OFF state). Further, in this embodiment, the developing roller 21 is rotationally driven in the development contact state. Further, in this embodiment, in the development contact state, the rotation of the developing roller 21 is stopped.

In this embodiment, the purpose of switching the state (between the photosensitive member 2 and the developing roller 21) to between the development contact state and the development separation state by the separating mechanism 40 is in that a level of the paper back contamination during subsequent image formation is improved by decreasing the amount of the fog toner transferred from the photosensitive member 2 onto the transfer roller 8 during the cleaning operation. That is, also, in this embodiment, during the cleaning operation, the cleaning voltage is adjusted by changing the developing voltage, and the cleaning of the transfer roller 8 is performed. However, as described in the embodiment 1, when the developing voltage is changed, there is a possibility that the fog toner amount is changed. That is, even in the case where a user (operator) intends to adjust the cleaning voltage to a cleaning voltage large in absolute value originally advantageous for the cleaning of the transfer roller 8, it can be said that there is a certain limit to a range of a selectable developing voltage from the viewpoints of an increase in fog toner amount and worsening of the paper back contamination with the fog toner amount increase. On the other hand, when the constitution including the separating mechanism 40 as in this embodiment is employed, during the cleaning operation, it becomes possible to mechanically separating the developing roller 21 from the photosensitive member 2. In this case, even when the set value of the developing voltage at which the fog toner occurs or the fog toner amount becomes large in the development contact state is selected, in the development separation state, there is no path along which the fog toner is transferred physically from the developing roller 21 onto the photosensitive member 2. For that reason, it becomes possible to form a state in which the fog toner does not generate on the photosensitive member 2.

Next, a condition on which execution of the cleaning operation in the development contact state is desired will be described in association with the fog toner amount. As described above, as the toner liable to cause the fog toner, it is possible to cite (1) the toner lowered in charge amount and (2) the toner charged to the opposite polarity to the normal charge polarity. As such a condition that the amount of the toner is large, i.e., a condition on which the fog toner generates in a large amount, the following condition can be cited. For example, it is possible to cite the case where the developing device 5 (the toner in the accommodating chamber 24) is left standing for a long period in a high-humidity environment, and the toner itself absorbs humidity and thus the charging performance lowers. Further, for example, it is possible to cite the case where the toner and the developing device 5 after durability that the image forming operation is repetitively performed are used. Particularly, when the image forming operation is repetitively performed, the toner in the developing device 5 is deteriorated by being subjected to mechanical damage due to flowing of the toner in the accommodating chamber 24, friction with the developing blade 22, or the like, and electrical damage due to energization and the charging action on the developing roller 21. Specifically, an external additive contributing to the toner charging property detaches from the toner or is embedded in the toner, so that the toner charging property lowers. This degree of toner deterioration can be grasped by, for example, an index correlating to a use amount of the developing paperback voltage 5 (the toner in the accommodating chamber 24). As this index, it is possible to cite an integrated value of the number of sheets subjected to the image formation (i.e., a total number of sheets subjected to the image formation) carried out by using the developing device 5, a rotation distance (or a rotation time) of the developing roller 21, an energization time of the developing blade 22, and the like. Further, this toner deterioration becomes conspicuous in the case where information on an environment (at least one of a temperature and a humidity on at least one of an inside and an outside of the image forming apparatus 1) indicates high-humidity environment. Further, the toner deterioration becomes more conspicuous with a smaller toner amount in the accommodating chamber 24. This is because compared with the case where the toner amount in the accommodating chamber 24 is large, in the case where the toner amount in the accommodating chamber 24 is small, a frequency at which a single toner particle is influenced by the above-described friction or energization is relatively enhanced. A degree of the influence of this toner amount in the accommodating chamber 24 on the toner deterioration can be grasped by using, for example, a residual toner amount in the accommodating chamber 24 as an index. Thus, with progress of the toner deterioration, probability of the presence of the toner low in charging property increases, and therefore, as a result, probability that the fog toner occurs increases.

Figure 10:
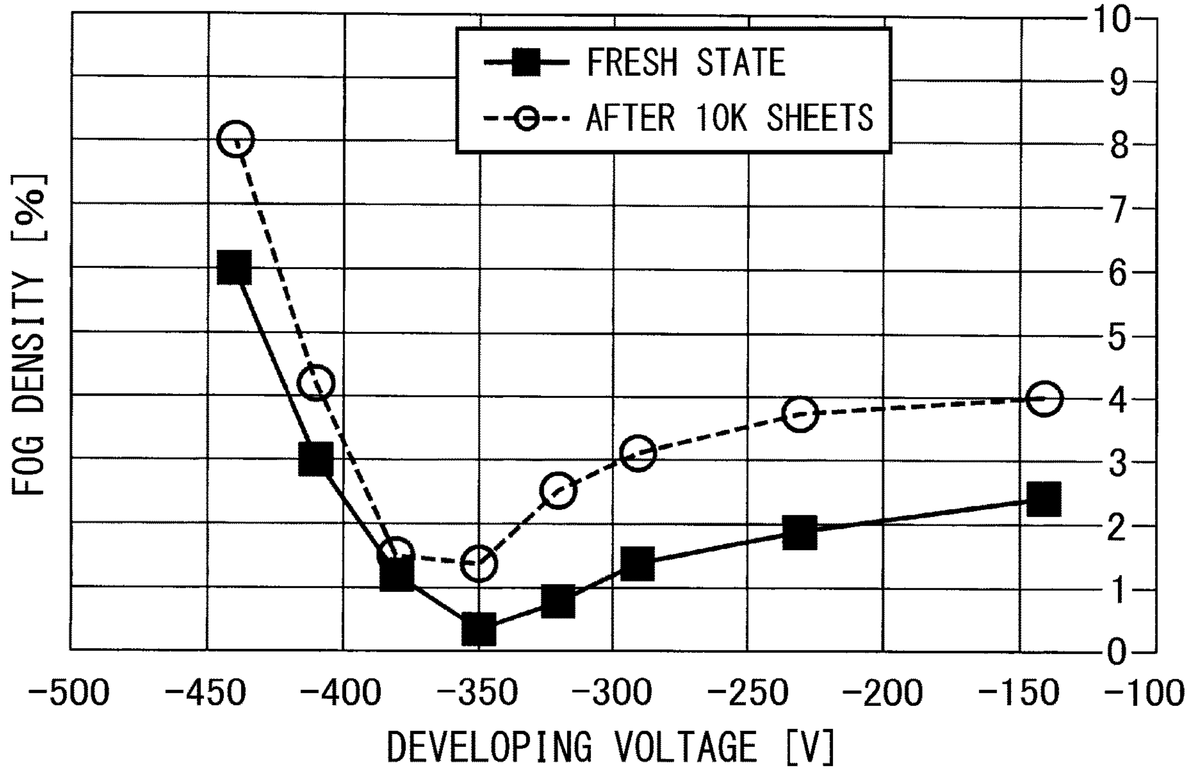
FIG. 10 is a graph showing another example of the developing voltage and the cleaning performance.

Using FIG. 10, an occurrence (generation) tendency of the fog toner between the toner of undurability and the toner after durability will be described. FIG. 10 is a graph showing a relationship between the set value of the developing voltage and the fog toner amount in the case where the dark-portion potential Vd is fixed at −500 V in the image forming apparatus 1 having the constitution of this embodiment. The "FRESH STATE" (undurability) as an explanatory legend in FIG. 10 refers to a result acquired using the developing device 5 and the toner which are in a fresh state such that a durability test is not executed, and the result is the same as the result of FIG. 6 described in the embodiment 1. Further, "AFTER 10K SHEETS" as an explanatory legend in FIG. 10 refers to a result acquired using the developing device 5 and the toner which are in a state after the durability test in which one-side continuous printing of 10K ($\times 10^3$) sheets is carried out using the developing device 5 and the toner which are in the fresh state. Incidentally, the recording material P used in the durability test is "GF-C 081 (A4-size paper, manufactured by Canon K.K., trade name), and as an image pattern formed during the durability test, a whole-surface half-tone image with a print ratio of 5% was used. The measuring method of the fog toner density is similar to the measuring method described in the embodiment 1.

From FIG. 10, it is understood that compared with the case where the developing device 5 of undurability and the toner of undurability are used, in the case where the developing device 5 and the toner after 10K sheets (after durability) are used, the fog toner amount as a whole increases. Thus, in a state in which the fog toner amount increases, as described above, by generation of the fog toner, there is a possibility that a range of the developing voltage selectable during the cleaning operation is substantially restricted.

Next, the cleaning operation in this embodiment will be described using FIG. 11.

Figure 11:
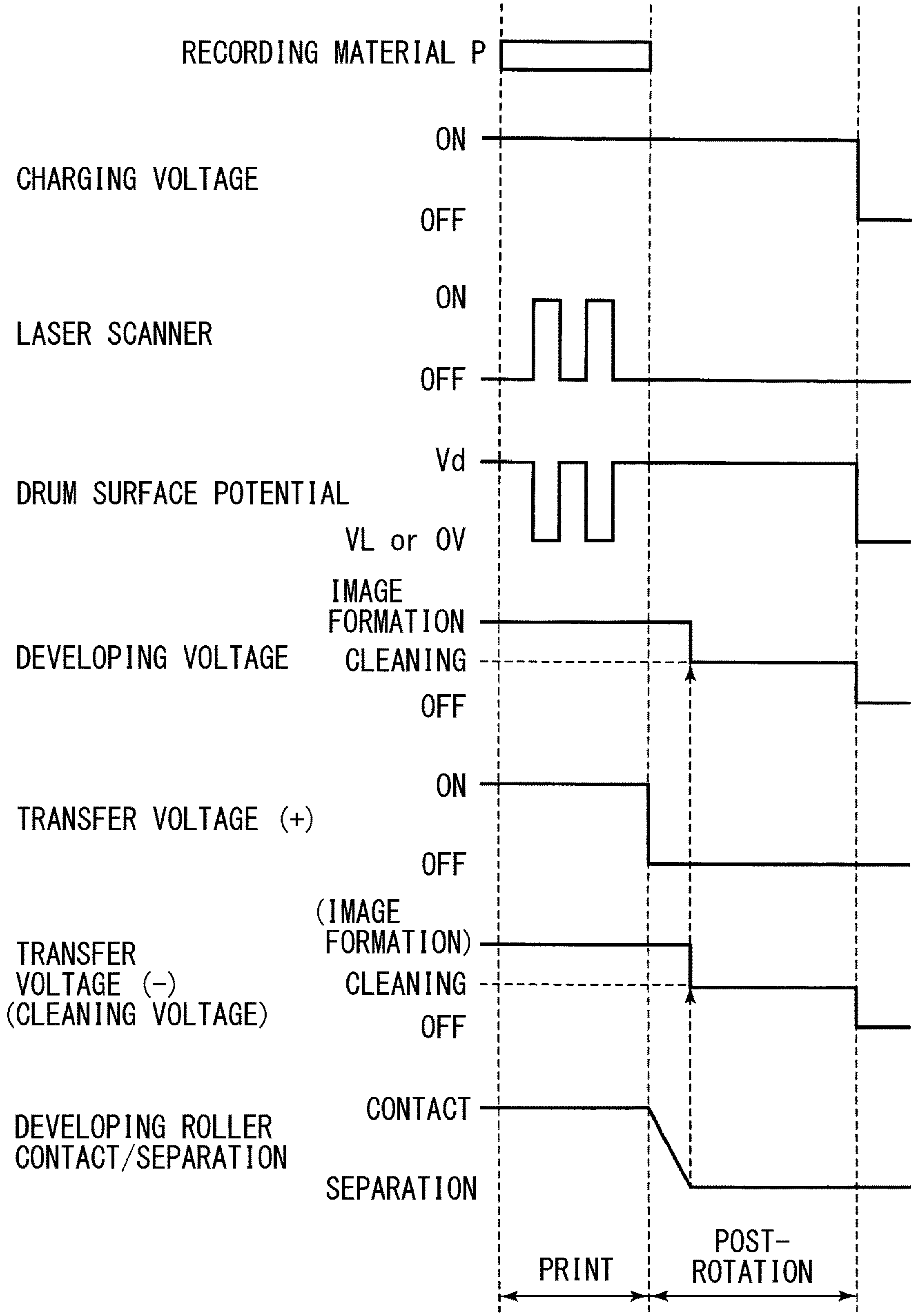
FIG. 11 is a timing chart for illustrating another example of the cleaning operation.

FIG. 11 is a timing chart showing an operation state of each of the respective portions in timings of the formation (printing) of the image on the final recording material P in the single print job and of the post-rotation after the image formation. In this embodiment, the controller 100 executes control of an operation of the print job in accordance with the timing chart shown in FIG. 11. In FIG. 11, states of the charging voltage, light emission of the laser scanner 4, the state potential of the photosensitive member 2, the developing voltage, the positive transfer voltage, the negative transfer voltage (cleaning voltage), and a developing roller contact/separation state are shown. Incidentally, the developing roller contact/separation state and items, other than the voltage control and accompanying the state are similar to those described in the embodiment 1.

In this embodiment, when the image formation is ended and the sequence goes to the post-rotation operation, the positive transfer voltage Vtrp is turned off, and substantially at the same time, a separating operation of separating the developing roller 21 from the photosensitive member 2 by the separating mechanism 40 is started. Then, after the separating operation is ended, a change in developing voltage Vdev from the set value for the image formation to the set value for the cleaning, and a change in transfer voltage (cleaning voltage) Vtrn from the set value for the image formation to the set value for the cleaning with the above-described change in developing voltage Vdev are made. Thus, by changing the developing voltage after the developing roller 21 is separated from the photosensitive member 2, as described above, it becomes possible to make setting of the cleaning voltage high in degree of freedom while suppressing the generation of the fog toner.

Thus, in this embodiment, during the cleaning operation, the developing roller 21 is separated from the photosensitive member 2 and the set value of the developing voltage is changed from the set value during the image formation, so that the set value of the cleaning voltage is controlled (adjusted). By this, it is possible to adjust the cleaning voltage to a cleaning voltage more advantageous for cleaning the transfer roller 8 while suppressing the generation of the fog toner during the cleaning operation. Accordingly, even in a toner state in which the fog toner is liable to relatively generate, it becomes possible to perform good cleaning of the transfer roller 8.

Figure 12:
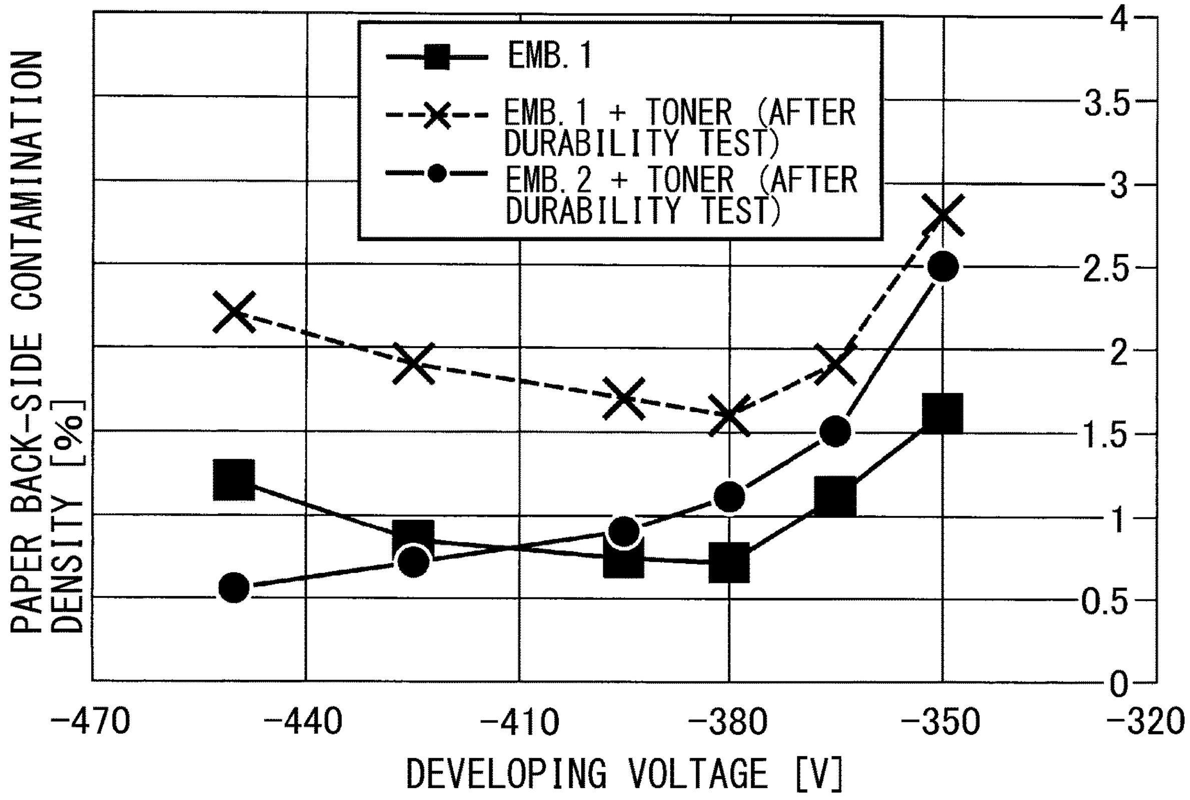
FIG. 12 is a graph showing another example of the relationship between the developing voltage and the cleaning performance.

Next, by using FIG. 12, a relationship between the developing voltage and the cleaning performance for (cleaning) the transfer roller 8 in this embodiment will be described. FIG. 12 is a graph showing a result of an experiment of the cleaning performance when the developing voltage (and the cleaning voltage) during the cleaning operation is changed in the image forming apparatus 1 in the constitution of this embodiment. Incidentally, an experiment condition in this embodiment is similar to that described in the embodiment 1.

Specifically, the experiment was conducted by being divided into two consisting of "preliminary sheet (paper) passing" in which the toner contamination is deposited on the transfer roller 8 and "sheet (paper) back-side contamination sheet passing" for evaluating sheet back-side contamination after the cleaning operation is executed. The developing voltage during the preliminary sheet passing was set at −350 V, and the developing voltage during the paper back contamination evaluation sheet passing was changed at levels shown in FIG. 12.

In FIG. 12, "EMB. 1" as an explanatory legend refers to a result of the constitution described in the embodiment 1, and specifically, an experimental result on a condition such that the developing roller 21 is not separated from the photosensitive member 2 during the cleaning operation and that the toner of undurability is used. That is, the "EMB. 1" in FIG. 12 shows the result of FIG. 8 again for comparison.

In FIG. 12, "EMB. 1+TONER (AFTER DURABILITY TEST)" as an explanatory legend refers to an experimental result on a condition such that the developing roller 21 is not separated from the photosensitive member 2 during the cleaning operation similarly as in the embodiment 1. However, in this experimental result, as the developing device 5 and the toner, the developing device 5 and the toner after the 10K durability (test) described using FIG. 10 were used. As described above with reference to FIG. 10, in the case where the toner and the developing device 5 after the durability are used, compared with the case where the toner and the developing device 5 which are in the fresh state, the fog toner is liable to generate. For that reason, it is understood that compared with the experimental result of "EMB. 1" in FIG. 12, the experimental result of "EMB. 1+TONER (AFTER DURABILITY TEST)" in FIG. 12 shows a tendency that the paper back contamination becomes worse as a whole. Particularly, on a condition that the developing voltage is larger in absolute value than −400 V, there is a tendency that the paper back contamination becomes worse. This is because as described above, the influence of the increase in amount of the fog toner transferred onto the photosensitive member 2 exceeds an effect on the cleaning performance of the transfer roller 8 due to an increase in absolute value of the cleaning voltage, with the result that the influence leads to a disadvantageous situation for the paper back contamination.

In FIG. 12, "EMB. 2+TONER (AFTER DURABILITY TEST)" as an explanatory legend refers to an experimental result of this embodiment on a condition such that the developing roller 21 is separated from the photosensitive member 2 during the cleaning operation. Further, in this experimental result, as the developing device 5 and the toner, the developing device 5 and the toner after the 10K durability (test) described using FIG. 10 were used. When the result of "EMB. 2+TONER (AFTER DURABILITY TEST)" in FIG. 12 and the result of "EMB. 1+TONER (AFTER DURABILITY TEST)" in FIG. 12 are compared with each other, it is understood that in the "EMB. 2+TONER (AFTER DURABILITY TEST)", particularly on a condition such that the developing voltage is larger in absolute value than −400 V, there is a tendency that the paper back contamination is improved. This is for the following reason. First, it is possible to cite a point such that the developing voltage is set at a relatively large absolute value, and therefore, the cleaning voltage is set at a cleaning voltage larger in absolute value advantageous for cleaning the transfer roller 8. In addition thereto, it is possible to cite a point such that the developing roller 21 is separated from the photosensitive member 2 during the cleaning operation and by this, the transfer of the fog toner onto the photosensitive member 2 is suppressed. That is, from the viewpoints of both these points, a level of the paper back contamination is improved.

Based on the above-described evaluation results, in a table 2 below, a performance evaluation result for the paper back contamination in each of the constitution of this embodiment (embodiment 2), and constitutions of comparison examples 3 and 4 is shown. As shown in the table 2, the constitutions and operations of image forming apparatuses 1 in the embodiment 2 (this embodiment) and the comparison examples 3 and 4 are substantially the same except that a power source structure and control voltage values are different as shown in the table 1.

TABLE 2

| | | | SETTING*3 | | | |
|---|---|---|---|---|---|---|
| | T&DD*1 | CSS*2 | DV*4 (V) | TRCV*5 (V) | PBC*6 [%] | DEGREE OF PBC*6 |
| EMB. 2 | AD | S | −450 | −1200 | 0.5 | GOOD |
| COMP.EX.3 | AD | C | −450 | −1200 | 2.2 | CN |
| COMP.EX.4 | AD | C | −380 | −800 | 1.6 | SC |

*1"T&DD" is the toner and the developing device used for the evaluation. "AD" is after the durability (test).
*2"CSS" is the contact/separation state of the developing roller during the cleaning of the transfer roller.
*3"SETTING" is voltage setting during cleaning of the transfer roller.
*4"DV" is the developing voltage.
*5"TRCV" is the transfer roller cleaning voltage.
*6"PBC" is the paper back contamination. "CN" is conspicuous. "SC" is somewhat conspicuous.

First, the result of this embodiment (embodiment 1) will be described. In this embodiment, the developing roller 21 is separated from the photosensitive member 2 during the cleaning operation. The developing voltage during the image formation is set at −350 V. Further, the developing voltage during the cleaning operation is set at −450 V, with the result that the cleaning voltage is set at −1200 V. On this condition, when the preliminary sheet passing the paper back contamination evaluation sheet passing were performed, the paper back contamination density was 0.5%, and a degree of the paper back contamination by eye observation discrimination was "good".

Next, the result of the comparison example 3 will be described. The comparison example 3 is similar to this embodiment in that the cleaning voltage and the developing voltage are outputted from the common power source and in that the developing voltage during the cleaning operation is set at −450, with the result that the cleaning voltage is set at −1200 V. However, the comparison example 3 is different from this embodiment in that the developing roller 21 is not separated from the photosensitive member 2 during the cleaning operation. On this condition, the amount of the ground fog toner generating during the cleaning operation is large, with the result that the paper back contamination density was 2.2%, and the degree of the paper back contamination by eye observation discrimination was a "conspicuous" result.

Next, the result of the comparison example 4 will be described. The comparison example 4 is different from this embodiment in that the developing voltage during the cleaning operation is set at −380 V with the result that the cleaning voltage is set at −800 V and in that the developing roller 21 is not separated from the photosensitive member 2 during the cleaning operation. On this condition, although the amount of the ground fog toner generating during the cleaning operation was suppressed to a relatively small amount, a suppression amount thereof in the case where the toner and the developing device 5 after the durability (test) were assumed was not sufficient. Further, as regards the cleaning voltage, only a cleaning voltage relatively small in absolute value was able to be applied to the transfer roller 8. The result was such that the paper back contamination density was 1.6%, and the degree of the paper back contamination by eye observation discrimination was a "somewhat conspicuous" result.

As described above, in this embodiment, the developing roller 21 is separated from the photosensitive member 2 during the cleaning operation. By this, the set value of the cleaning voltage can be set at a set value advantageous for cleaning the transfer roller 8 while reducing the fog toner amount during the cleaning operation. For that reason, even in the case where the toner, such as the toner after durability (test), from which the fog toner is liable to generate is used, good cleaning of the transfer roller 8 can be performed.

Incidentally, in this embodiment, the constitution in which for the purpose of enhancing the cleaning property for the transfer roller 8, during the cleaning operation, the developing roller 21 is always separated from the photosensitive member 2 was described, but the present invention is not limited to such a constitution. For example, by executing the separating operation, the case where downtime (a time in which the image cannot be formed) becomes relatively long and the case where operation noise is generated occur. For that reason, in some cases, it is desired that the separating operation is not executed as much as possible. Therefore, as described above, on the basis of the index indicating ease of generation of the fog toner, such as a situation of the toner durability, installation environment information of the image forming apparatus 1, or the like, during the cleaning operation, it is also possible to make switching between the case where separation of the developing roller 21 from the photosensitive member 2 is executed and the case where the separation is not executed.

Figure 20:
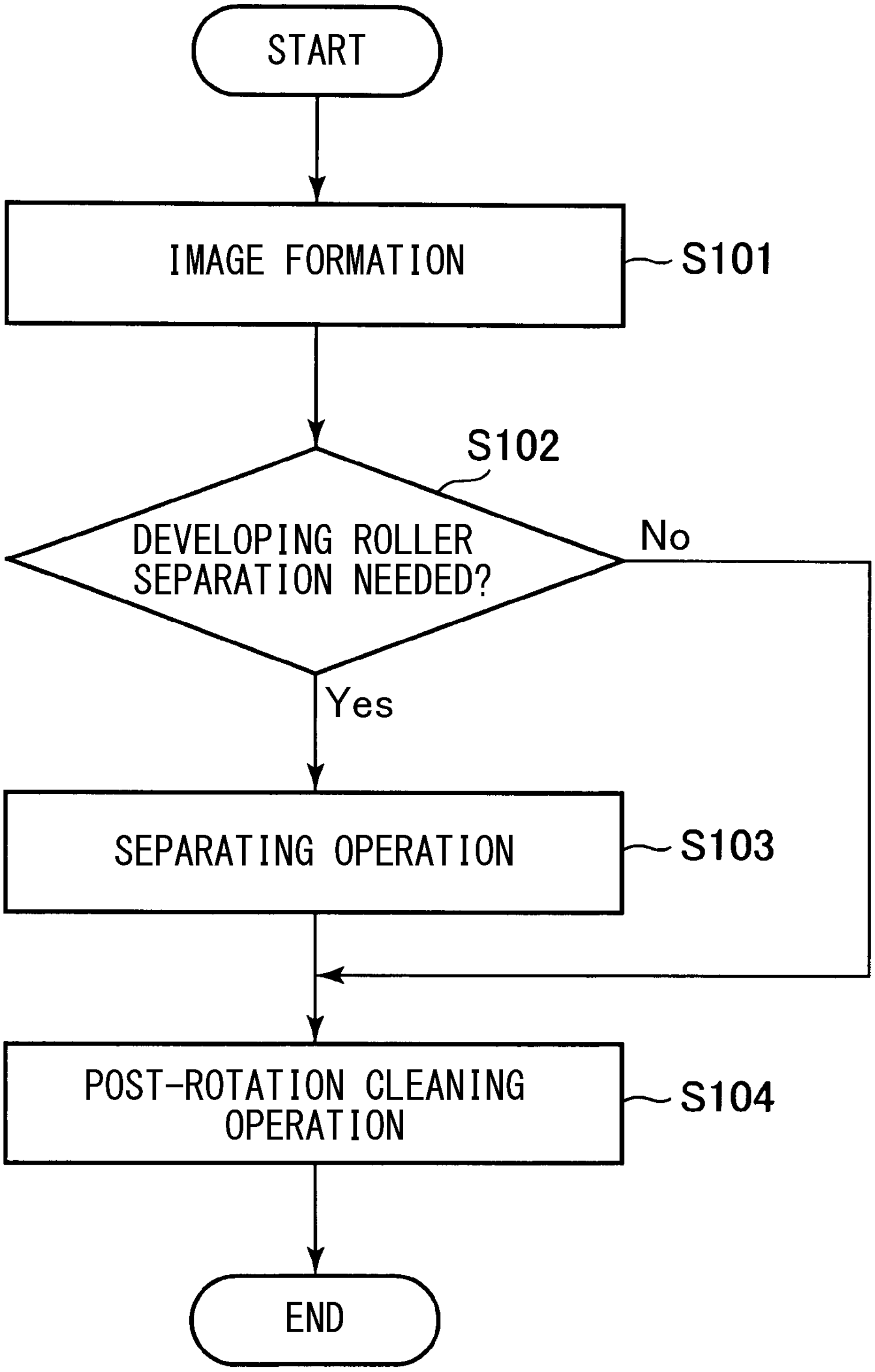
FIG. 20 is a schematic flowchart of a control for switching a contact/separation state of a developing roller during the cleaning operation.

FIG. 20 is a schematic flowchart of control of switching execution and non-execution of the separation of the developing roller 21 from the photosensitive member 2 in the case where the cleaning operation is performed during the post-rotation of the print job. When image formation designated by the print job is ended (S101), when the sequence goes to the post-rotation operation, the controller 100 discriminates whether or not the separation of the developing roller 21 from the photosensitive member 2 is needed in the cleaning operation (S102). For example, as an index correlating to the use amount of the developing device 5 (the toner in the accommodating chamber 24) indicating the degree of the toner deterioration, the integrated value of the number of sheets subjected to the image formation carried out using the developing device 5 is sequentially updated and stored in the memory 102, functioning as a counter, controlled by the controller 100. Then, for example, in the case where the number of sheets, subjected to the image formation, stored in the memory 102 becomes not less than a threshold set in advance, the controller 100 discriminates that there is a need to separate the developing roller 21 from the photosensitive member 2 during the cleaning operation. In the case where the controller 100 discriminated in S102 that the separation is needed ("Yes"), the controller 100 causes the image forming apparatus 1 to execute the separating operation in which the developing roller 21 is separated from the photosensitive member 2 as described above (S103), and then causes the image forming apparatus 1 to execute the cleaning operation during the post-rotation (S104). On the other hand, in the case where the controller 100 discriminated in S102 that the separation is not needed ("No"), the cleaning operation is not performed, but the cleaning operation during the post-rotation is performed (S104). Incidentally, as described above, the index indicating the degree of the toner deterioration is not limited to the number of sheets subjected to the image formation, but the rotation distance (or the rotation time) of the developing roller 21, the energization time of the developing blade 22, or the like may be used. Further, on the basis of a detection result of the environment by an environment sensor (such as a temperature/humidity sensor) provided in the image forming apparatus 1, the separating operation may be executed, for example, in a high-humidity environment. Further, on the basis of a detection result of a remaining (toner) amount detecting sensor for detecting a remaining amount of the toner in the accommodating chamber 24, in the case where the remaining amount of the toner in the accommodating diameter 24 becomes not less than a predetermined threshold set in advance, the separating operation may be executed. Pieces of control of the execution or non-execution of the separating operation depending on these indices can be arbitrarily combined with each other. Further, in the case where the cleaning operation is executed after a jam of the recording material P occurred, the separating operation may be executed so that the absolute value of the cleaning voltage can be increased as large as possible.

Further, in this embodiment, as the voltage applying portion using the power source common to itself and the cleaning voltage applying portion E4, the voltage applying portion (above-described developing voltage applying portion E2) to the developing roller 21 was selected, but the present invention is not limited thereto. When the constitution in which the developing roller 21 can be separated from the photosensitive member 2 as in this embodiment is employed, generation of the fog toner during the cleaning operation is suppressed. For that reason, as the voltage applying portion using the power source common to itself and the cleaning voltage applying portion, for example, it is also possible to select the above-described regulating member voltage applying portion or the above-described supplying member voltage applying portion.

That is, as the voltage applying portion using the power source common to itself and the cleaning voltage applying portion, it is possible to select the voltage applying portion for applying the voltage to any developing member relating to the image formation (toner image formation) by the developing device 5, such as the developing roller 21, the developing blade 22, the supplying roller 23, and the like. Herein, the voltage which is applied to the developing member such as the developing roller 21, the developing blade 22, or the supplying roller 23 and which is relates to the image formation (toner image formation) by the developing device 5 is collectively referred to as a "developing voltage" in some instances. Further, herein, the voltage applying portion (voltage applying means) for applying the voltage to the developing member such as the developing roller 21, the developing blade 22, or the supplying member 23 is collectively referred to as a "developing voltage applying portion" in some instances.

Further, in this embodiment, description was made such that the developing roller 21 is separated from the photosensitive member 2 in a whole period in which the cleaning voltage is applied to the transfer roller 8, but the present invention is not limited thereto. By separating the developing roller 21 from the photosensitive member 2 in at least a part of the period in which the cleaning voltage is applied to the transfer roller 8 in the cleaning operation, a corresponding effect can be obtained.

Thus, the developing member may include the developer carrying member for carrying and feeding the toner and for supplying the toner to the photosensitive member 2, and the developing voltage applying portion E2 may be a member for applying the voltage to the developer carrying member. Further, the developing member may include the developer carrying member which carries, feeds, and supplies the toner to the photosensitive member 2 and may include the regulating member for regulating the amount of the toner carried on the developer carrying member, and the developing voltage applying portion E2 may be a developing voltage applying portion for applying the voltage to the regulating member. Further, the developing member may include the developer carrying member which carries, feeds, and supplies the toner to the photosensitive member 2 and may include the supplying member for supplying the toner to the developer carrying member, and the developing voltage applying portion E2 may be a developing voltage applying portion for applying the voltage to the supplying member. Further, the image forming apparatus 1 may include the separating mechanism 40 capable of moving the developer carrying member between the contact position where the developer carrying member contacts the photosensitive member 2 and the separated position where the developer carrying member is separated from the photosensitive member 2. Further, the controller 100 is capable of controlling the separating mechanism 40 so that the developer carrying member is disposed in the separated position in at least a part of the period in which the voltage of the same polarity as the normal charge polarity of the toner is applied to the transfer roller 8 in the non-image forming operation.

Next, another embodiment (embodiment 3) of the present invention will be described. Basic constitution and operation of an image forming apparatus of this embodiment are the same as those in the embodiments 1 and 2. Accordingly, in the image forming apparatus of this embodiment, elements having the same or corresponding functions or constitutions to those of the image forming apparatuses in the embodiments 1 and 2 will be omitted from detailed description by adding the same reference numeral or symbols as those in the embodiments 1 and 2.

In the embodiments 1 and 2, as the voltage applying portion using the power source common to itself and the cleaning voltage applying portion E4, the developing voltage applying portion E2 was selected. On the other hand, in this embodiment (embodiment 3), the power source for the cleaning voltage applying portion E4 is common to itself and not only the developing voltage applying portion E2 but also the charging voltage applying portion E1. That is, in this embodiment, the cleaning voltage, the developing voltage, and the charging voltage are supplied from the common power source. Incidentally, similarly as in the image forming apparatus 1 of the embodiment 2, the image forming apparatus 1 of this embodiment includes the separating mechanism 40, and similarly as in the embodiment 2, the image forming apparatus 1 of this embodiment is capable of separating the developing roller 21 from the photosensitive member 2 during the cleaning operation.

Figure 13:
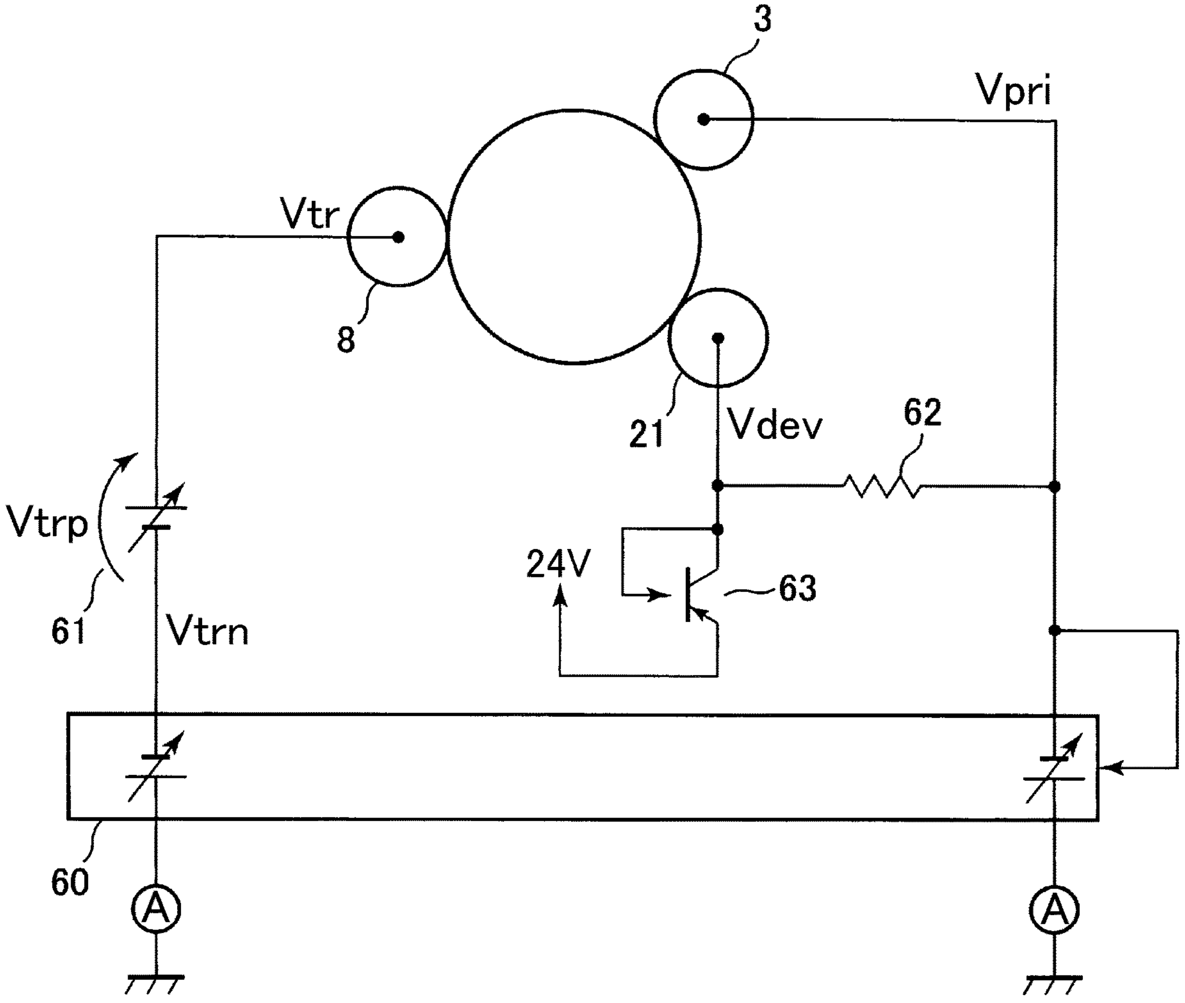
FIG. 13 is a schematic circuit diagram showing another example of the high-voltage circuit constitution of the image forming apparatus.

A high-voltage circuit constitution in which the developing voltage, the charging voltage, and the cleaning voltage are outputted from a common power source in this embodiment will be described using FIG. 13. FIG. 13 is an illustration of the high-voltage circuit constitution in this embodiment.

First, by a first voltage boosting circuit (power source) 60 constituted by a transformer or the like, a charging voltage Vpri and a negative transfer voltage (cleaning voltage) Vtrn are generated. The charging voltage Vpri is applied to the charging roller 3. Further, by a second voltage boosting circuit (another power source) 61 constituted by a transformer or the like, a positive transfer voltage (cleaning voltage) Vtrp is generated. Further, during the image formation (during the transfer), to the transfer roller 8, a transfer voltage Vtr in a superimposed form of the negative transfer voltage (cleaning voltage) Vtrn and the positive transfer voltage (cleaning voltage) Vtrp is applied. In this embodiment, a voltage applying portion (voltage applying means) for applying the cleaning voltage to the transfer roller 8 by using the first voltage boosting circuit 60 as the power source corresponds to the "cleaning voltage applying portion (or a second transfer voltage applying portion)" E4. Further, in this embodiment, a voltage applying portion (voltage applying means) for applying the charging voltage to the charging roller 3 by using the first voltage boosting circuit 60 as the power source corresponds to the "charging voltage applying portion" E1. Further, in this embodiment, a voltage applying portion (voltage applying means) for applying the transfer voltage to the transfer roller 8 by using the second voltage boosting circuit 61 (and further the first voltage boosting circuit 60) as the power source corresponds to the "transfer voltage applying portion (or a first transfer voltage applying portion)" E3.

In this embodiment, the first voltage boosting circuit 60 subjects the charging voltage Vpri to feed-back control in order to accurately control the charging voltage Vpri. Further, in the high-voltage circuit constitution of this embodiment, the negative transfer voltage Vtrn and the charging voltage Vpri are separated in a circuit manner, but the voltages interrelated with each other are outputted. That is, in this embodiment, when an absolute value of the charging voltage Vpri is made large, an absolute value of the negative transfer voltage (cleaning voltage) Vtrn also becomes large, and when the absolute value of the charging voltage Vpri is made small, the absolute value of the negative transfer voltage (cleaning voltage) Vtrn also becomes small. For that reason, in this embodiment, by adjusting the charging voltage Vpri, it becomes possible to change the negative transfer voltage (cleaning voltage) Vtrn.

Here, the influence of a load in the first voltage boosting circuit 60 in this embodiment will be described. In the high-voltage circuit constitution in this embodiment, in the case where the load of the charging roller 3 is heavy, control such that the charging voltage Vpri is maintained at a control value by increasing the output voltage value of the first voltage boosting circuit 60 is carried out. By this, an absolute value of the negative transfer voltage (cleaning voltage) increases. On the other hand, in the case where the load of the charging roller is large, control such that the output voltage value of the first voltage boosting circuit 60 is carried out, so that the absolute value of the negative transfer voltage (cleaning voltage) decreases.

A developing voltage Vdev is generated by dividing the charging voltage Vpri of 24 V with a resistor 62 and a transistor 63. In this embodiment, in order to accurately control the developing voltage Vdev, conduction of the transistor 63 is controlled by feeding back the developing voltage Vdev. Here, as regards the high-voltage circuit constitution, the load of the first voltage boosting circuit 60 is heavier in the case where the transistor 63 is in an on state than in the case where the transistor 53 is in an off state. That is, in this embodiment, the absolute value of the negative transfer voltage (cleaning voltage) Vtrn becomes larger when an absolute value of the developing voltage Vdev is made smaller, and becomes smaller when the absolute value of the developing voltage Vdev is made larger. In this embodiment a voltage applying portion (voltage applying means) for applying the developing voltage to the developing roller 21 by using the first voltage boosting circuit 60 as a power source corresponds to a developing voltage applying portion" E2.

Figure 14:
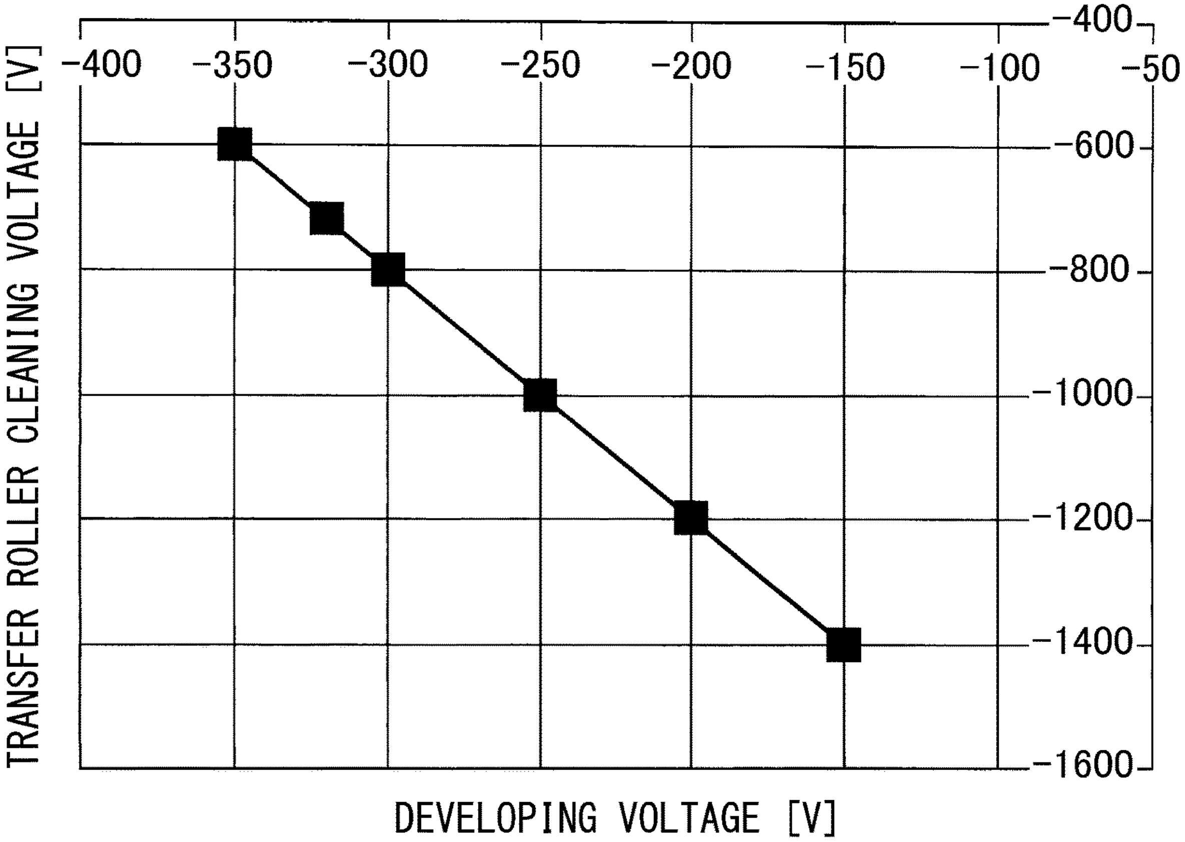
FIG. 14 is a graph showing another example of a relationship between the cleaning voltage and the developing voltage.

Using FIG. 14, a relationship between the developing voltage and the cleaning voltage in this embodiment will be described. FIG. 14 is a graph showing the relationship between the developing voltage and the cleaning voltage in this embodiment. As described above, in this embodiment, it is possible to change the cleaning voltage by adjusting the developing voltage. As is understood from FIG. 14, in this embodiment, in the case where the developing voltage is set at, for example, −350 V which is the developing voltage during the image formation, the cleaning voltage of about −600 V is applied to the transfer roller 8. Further, when the developing voltage is changed to −300 V, for example, during the cleaning operation, the cleaning voltage of about −800 V which is more advantageous for the cleaning of the transfer roller 8 is applied to the transfer roller 8. Incidentally, FIG. 14 is a result acquired on a condition such that the load of the charging roller 3 is relatively stabilized. A condition on which the load of the charging roller 3 fluctuated will be described later in another embodiment.

Incidentally, the high-voltage circuit constitution usable in this embodiment is not limited to the high-voltage contact constitution shown in FIG. 13, but can be appropriately changed when a circuit having a similar function is employed. Further, the relationship between the developing voltage and the cleaning voltage is not limited to the relationship shown in FIG. 14, but can be changed depending on electric resistance values of the respective members on the circuit, a performance of the voltage boosting circuit, or the like.

Figure 15:
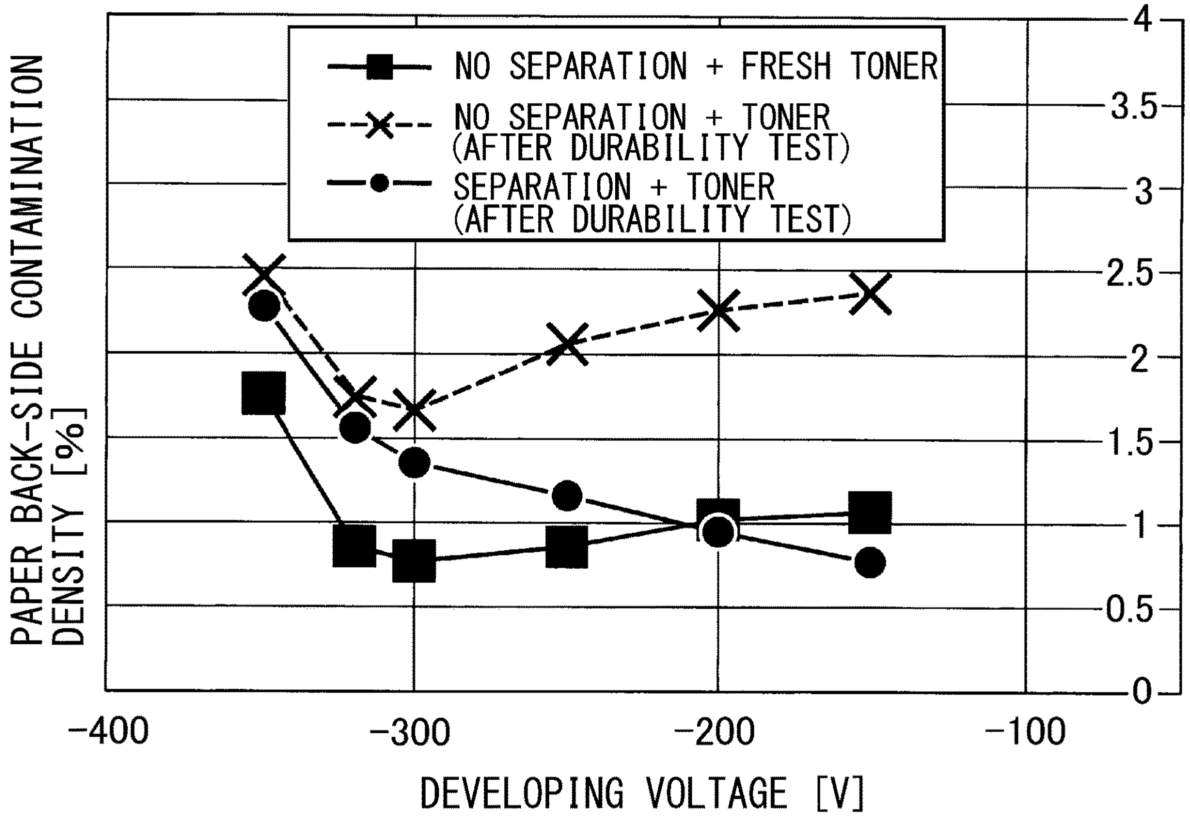
FIG. 15 is a graph showing another example of the relationship between the developing voltage and the cleaning performance.

Next, by using FIG. 15, a relationship between the developing voltage and the cleaning performance for (cleaning) the transfer roller 8 in this embodiment will be described. FIG. 15 is a graph showing a result of an experiment of the cleaning performance when the developing voltage (and the cleaning voltage) during the cleaning operation is changed in the image forming apparatus 1 in the constitution of this embodiment. Incidentally, an experimental condition in this embodiment is similar to the experimental condition described in the embodiment 1. Specifically, the experiment was conducted by being divided into two consisting of "preliminary sheet (paper) passing" in which the toner contamination is deposited on the transfer roller 8 and "sheet (paper) back-side contamination sheet passing" for evaluating sheet back-side contamination after the cleaning operation is executed. The developing voltage during the preliminary sheet passing was set at −350 V, and the developing voltage during the paper back contamination evaluation sheet passing was changed at levels shown in FIG. 15.

In the constitution of this embodiment, as described above, the cleaning voltage absolute value becomes larger with a smaller developing voltage absolute value, so that an effect of cleaning the transfer roller 8 is enhanced. On the other hand, as described above using FIG. 6, in the case where the developing voltage absolute value is made small, the amount of the reverse fog toner transferred onto the photosensitive member increases.

First, an experimental result of "NO SEPARATION+FRESH TONER" as an explanatory legend in FIG. 15 will be described. This experimental result is an experimental result on a condition that similar as in the embodiment 1, the developing roller 21 is not separated from the photosensitive member 2 during the cleaning operation and the toner of undurability is used. On this condition, it is understood that the paper back contamination was most improved in the case where the developing voltage was set at −300 V. On the other hand, on a condition that the developing voltage absolute value is larger than −320 V and a condition that the developing voltage absolute value is smaller than −250 V, it is understood that the paper back contamination becomes somewhat worse.

In a region in which the developing voltage absolute value is larger than −320 V, the developing voltage relatively large in absolute value is applied to the developing roller 21. As described above using FIG. 14, in the constitution of this embodiment, on the condition that the absolute value of the developing voltage is large, there is a tendency that the absolute value of the cleaning voltage becomes small. For this reason, the cleaning voltage enough to remove the toner deposited on the transfer roller 8 by the preliminary sheet passing was not applied to the transfer roller 8 during the cleaning operation, so that the toner remaining on the transfer roller 8 appeared as the paper back contamination during the paper back contamination evaluation sheet passing.

On the other hand, in a region in which the developing voltage absolute value is smaller than −250 V, the developing voltage relatively large in absolute value is applied to the developing roller 21. For that reason, during the cleaning operation, the cleaning voltage large in absolute value which is advantageous for cleaning the transfer roller 8 is applied to the transfer roller 8. However, as described above using FIG. 6, the condition that the developing voltage relatively small in absolute value is applied to the developing roller 21 is also a condition that the reverse fog toner is liable to be transferred onto the recording material P. For that reason, the reverse fog toner generated on the photosensitive member 2 during the cleaning operation was transferred onto the transfer roller 8, and appeared as the paper back contamination during the subsequent paper back contamination evaluation sheet passing.

On the contrary, in a region in which the developing voltage is about −300 V, similarly as in the region in which the developing voltage absolute value is larger than −320 V, the fog toner on the photosensitive member 2 is relatively small. Further, in the region in which the developing voltage is about −300 V, the cleaning voltage relatively large in absolute value similarly as in the region in which the developing voltage absolute value is smaller than −250 V is applied to the transfer roller 8. For that reason, the region in which the developing voltage is about −300 V can be said as being on a condition effective in the paper back contamination from the viewpoints of both the transfer of the fog toner to the transfer roller 8 and the removal of the toner deposited on the transfer roller 8.

Further, the performance evaluation result of the paper back contamination for the "NO SEPARATION+FRESH TONER" of the legend in FIG. 15 was such that on the condition that the developing voltage was set at −300 V, the paper back contamination density was 0.8% and the degree of the paper back contamination by eye observation discrimination was "good". This result is similar to the result of the embodiment 1, and even in the constitution in which the cleaning voltage, the developing voltage, and the charging voltage are supplied from the common power source as in this embodiment, it is understood that it is possible to performing good cleaning of the transfer roller 8 similarly as in the embodiment 1.

Next, an environmental result of "NO SEPARATION+TONER (AFTER DURABILITY TEST) as a legend in FIG. 15 will be described. This experimental result is an experimental result on the condition that the developing roller 21 was not separated from the photosensitive member during the cleaning operation similarly as in the embodiment 1. However, in this experimental result, as the developing device 5 and the toner, the developing device 5 and the toner after the 10K durability (test) described using FIG. 10 were used. As described above with reference to FIG. 10, in the case where the toner and the developing device 5 after the durability are used, compared with the case where the toner and the developing device 5 which are in the fresh state, the fog toner is liable to generate. For that reason, it is understood that compared with the experimental result of "NO SEPARATION+FRESH TONER" in FIG. 15, the experimental result of "NO SEPARATION+TONER (AFTER DURABILITY TEST)" in FIG. 15 shows a tendency that the paper back contamination becomes worse as a whole.

Next, "SEPARATION+TONER (AFTER DURABILITY TEST)" as in FIG. 15 will be described. This experimental result is an experimental result on a condition such that the developing roller 21 is separated from the photosensitive member 2 during the cleaning operation similarly as in the embodiment 21. Further, in this experimental result, as the developing device 5 and the toner, the developing device 5 and the toner after the 10K durability (test) described using FIG. 10 were used. It is understood that on this condition, particularly on a condition such that the developing voltage is smaller in absolute value than −300 V, there is a tendency that the paper back contamination is improved. This is for the following reason. First, it is possible to cite a point such that the developing voltage is set at a relatively small absolute value, and therefore, the cleaning voltage is set at a cleaning voltage larger in absolute value advantageous for cleaning the transfer roller 8. In addition thereto, it is possible to cite a point such that the developing roller 21 is separated from the photosensitive member 2 during the cleaning operation and by this, the transfer of the fog toner onto the photosensitive member 2 is suppressed. That is, from the viewpoints of both these points, a level of the paper back contamination is improved.

Further, the performance evaluation result of the paper back contamination for the "NO SEPARATION+TONER (AFTER DURABILITY TEST" of the legend in FIG. 15 was such that on the condition that the developing voltage was set at −150 V, the paper back contamination density was 0.8% and the degree of the paper back contamination by eye observation discrimination was "good". This result is similar to the result of the embodiment 2, and even in the case where the toner further lowered in charging performance is assumed in the constitution in which the cleaning voltage, the developing voltage, and the charging voltage are supplied from the common power source as in this embodiment, it is understood that it is possible to performing good cleaning of the transfer roller 8 similarly as in the embodiment 2.

Incidentally, in this embodiment, similarly as in the embodiment 2, the constitution in which the developing roller 21 can be separated from the photosensitive member 2 was described, but similarly as in the embodiment 1, commonality of the power source may be achieved between the cleaning voltage, the developing voltage, and the charging voltage.

Next, another embodiment (embodiment 4) of the present invention will be described. Basic constitution and operation of an image forming apparatus of this embodiment are the same as those in the embodiments 1 to 3. Accordingly, in the image forming apparatus of this embodiment, elements having the same or corresponding functions or constitutions to those of the image forming apparatuses in the embodiments 1 to 3 will be omitted from detailed description by adding the same reference numeral or symbols as those in the embodiments 1 to 3.

In the embodiments 2 and 3, the developing roller 21 was separated from the photosensitive member 2 during the cleaning operation, so that the transfer of the fog toner onto the photosensitive member 2 during the cleaning operation was suppressed. In this embodiment, similarly as in the embodiments 1 and 2, the developing roller 21 is separated from the photosensitive member 2 during the cleaning operation. In addition, in this embodiment, light emission of the laser scanner 4 is performed during the cleaning operation, so that the surface potential of the photosensitive member 2 is changed to the light-portion potential VL. Incidentally, a high-voltage circuit constitution of an image forming apparatus 1 of this embodiment is similar to the high-voltage circuit constitution of the image forming apparatus 1 of the embodiment 3.

First, the reason why the light emission of the laser scanner 4 is performed during the cleaning operation will be described.

The cleaning operation is such that the cleaning voltage of the same polarity (negative polarity in this embodiment) as the normal charge polarity of the toner is applied to the transfer roller 8, and the toner deposited on the transfer roller 8 is transferred onto the photosensitive member 2, so that the toner deposited on the transfer roller 8 is removed. This transfer of the toner onto the photosensitive member 2 is performed utilizing principally an electrostatic force, so that the cleaning property for the transfer roller 8 is enhanced with an increasing potential difference between the transfer roller 8 (cleaning voltage) and the photosensitive member 2.

Here, when the constitution of the embodiment 2 is taken as an example, during the cleaning operation, the light emission of the laser scanner 4 is not performed, and therefore, the surface potential of the photosensitive member 2 is −500 V which is the dark-portion potential Vd. For example, in this condition, when the cleaning voltage of −1000 V is applied to the transfer roller 8, a potential difference obtained by subtracting the potential (cleaning voltage) of the transfer roller 8 from the surface potential of the photosensitive member 2 is 500 V (=−500 V−(−1000 V)). That is, this potential difference of 500 V becomes a driving force for transferring, onto the photosensitive member 2, the toner deposited on the transfer roller 8 during the cleaning operation.

On the other hand, during the cleaning operation, when the light emission of the laser scanner 4 is performed, the surface potential of the photosensitive member 2 is changed to −100 V which is the light-portion potential VL. Then, on this condition, when the cleaning voltage of −1000 V is applied to the transfer roller 8 similarly as described above, a potential difference obtained by subtracting a potential (cleaning voltage) of the transfer roller 8 from the surface potential of the photosensitive member 2 is 900 V (=−100 V−(−1000 V)). That is, compared with the case where the light emission of the laser scanner 4 was not performed, it becomes possible to provide a larger potential difference, and correspondingly, the cleaning performance for the transfer roller 8 can be improved.

Next, the reason why the developing roller 21 is separated from the photosensitive member 2 in the case where the light emission of the laser scanner 4 is performed during the cleaning operation will be described. As described above, when the light emission of the laser scanner 4 is performed during the cleaning operation, the surface potential of the photosensitive member 2 becomes the light-portion potential VL.

In this state, when the development contact/separation state in maintained without separating the developing roller 21 from the photosensitive member 2, the potential difference between the photosensitive member 2 and the developing roller 21 becomes a potential difference for transferring the toner from the developing roller 21 onto the photosensitive member 2. That is, the potential of the developing roller 21 becomes larger in absolute value than the surface potential of the photosensitive member 2. In this state, when cleaning (application of the cleaning voltage to the transfer roller 8) of the transfer roller 8 is performed, the toner transferred on the photosensitive member 2 is transferred onto the transfer roller 8, so that the transfer roller 8 is contaminated with the toner. In order to suppress such a situation, in this embodiment, in the case where the light emission of the laser scanner 4 is performed during the cleaning operation, the developing roller 21 is separated from the photosensitive member 2.

Figure 16:
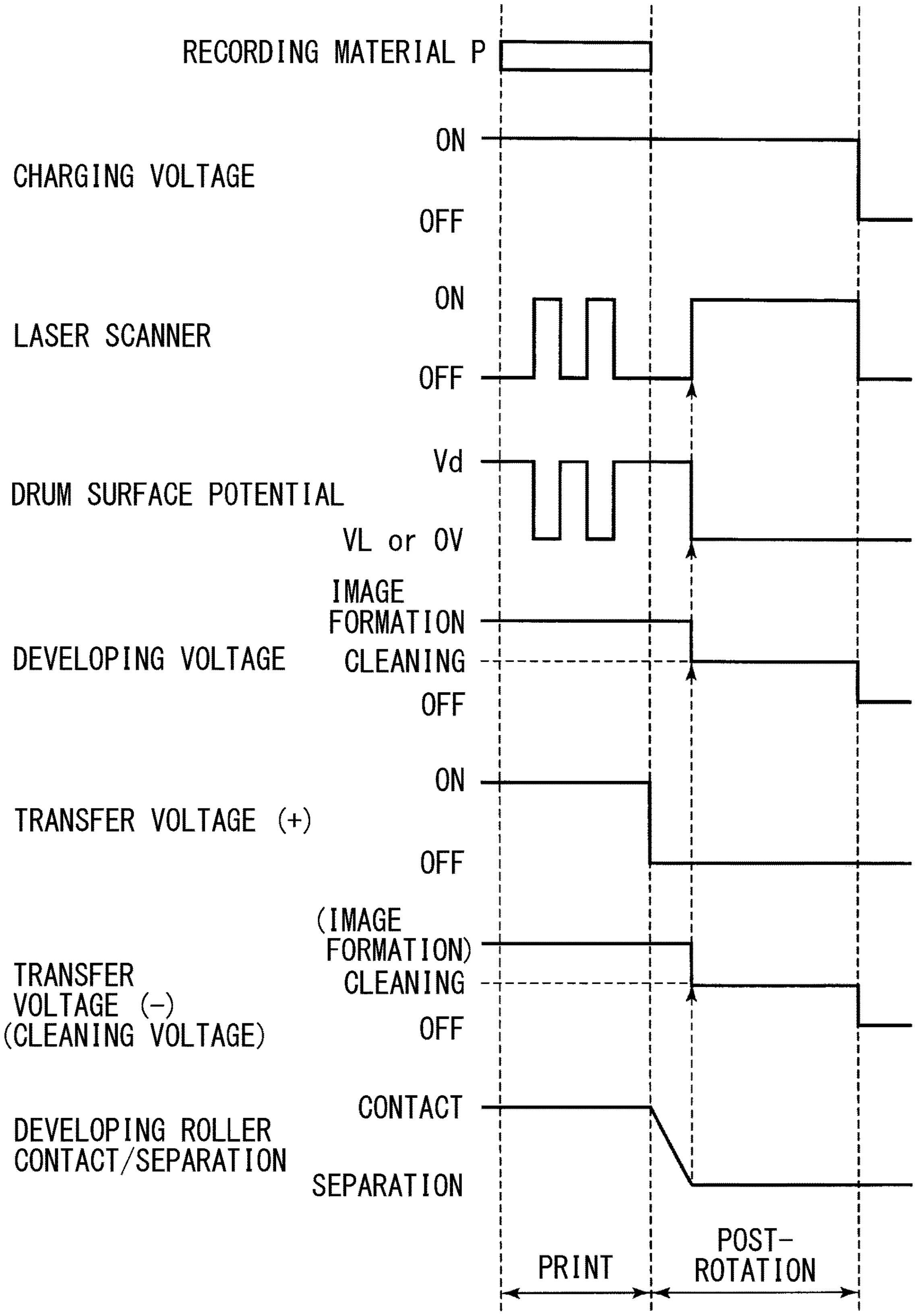
FIG. 16 is a timing chart for illustrating another example of the cleaning operation.

Next, using FIG. 16, the cleaning operation in this embodiment will be described. FIG. 16 is a timing chart showing an operation state of each of the respective portions in timings of the formation (printing) of the image on the final recording material P in the single print job and of the post-rotation after the image formation. In this embodiment, the controller 100 executes control of an operation of the print job in accordance with the timing chart shown in FIG. 16. In FIG. 16, states of the charging voltage, light emission of the laser scanner 4, the state potential of the photosensitive member 2, the developing voltage, the positive transfer voltage, the negative transfer voltage (cleaning voltage), and a developing roller contact/separation state are shown. Incidentally, the developing roller contact/separation state and items, other than the voltage control accompanying the state, and a light emission state of the laser scanner 4 are similar to those described in the embodiments 1 to 3.

In this embodiment, when the image formation is ended and the sequence goes to the post-rotation operation, the positive transfer voltage Vtrp is turned off, and substantially at the same time, a separating operation of separating the developing roller 21 from the photosensitive member 2 by the separating mechanism 40 is started. Then, after the separating operation is ended, a change in developing voltage Vdev from the set value for the image formation to the set value for the cleaning, and a change in transfer voltage (cleaning voltage) Vtrn from the set value for the image formation to the set value for the cleaning with the above-described change in developing voltage Vdev are made.

Further, substantially at the same time, the light emission of the laser scanner is performed ("ON"), so that a whole surface (entirety of the image forming region with respect to a direction substantially perpendicular to the movement direction of the surface of the photosensitive member 2) of the photosensitive member 2 is in a light exposure state (light-portion potential VL). Thus, the light emission of the laser scanner 4 is performed after the developing roller 21 is separated from the photosensitive member 2, so that it is possible to suppress that unnecessary toner is transferred from the developing roller 21 onto the photosensitive member 2. Further, the potential difference between the photosensitive member 2 and the transfer roller 8 (cleaning voltage) during the cleaning operation is changed largely, so that the cleaning performance of the cleaning of the transfer roller 8 can be improved.

Figure 17:
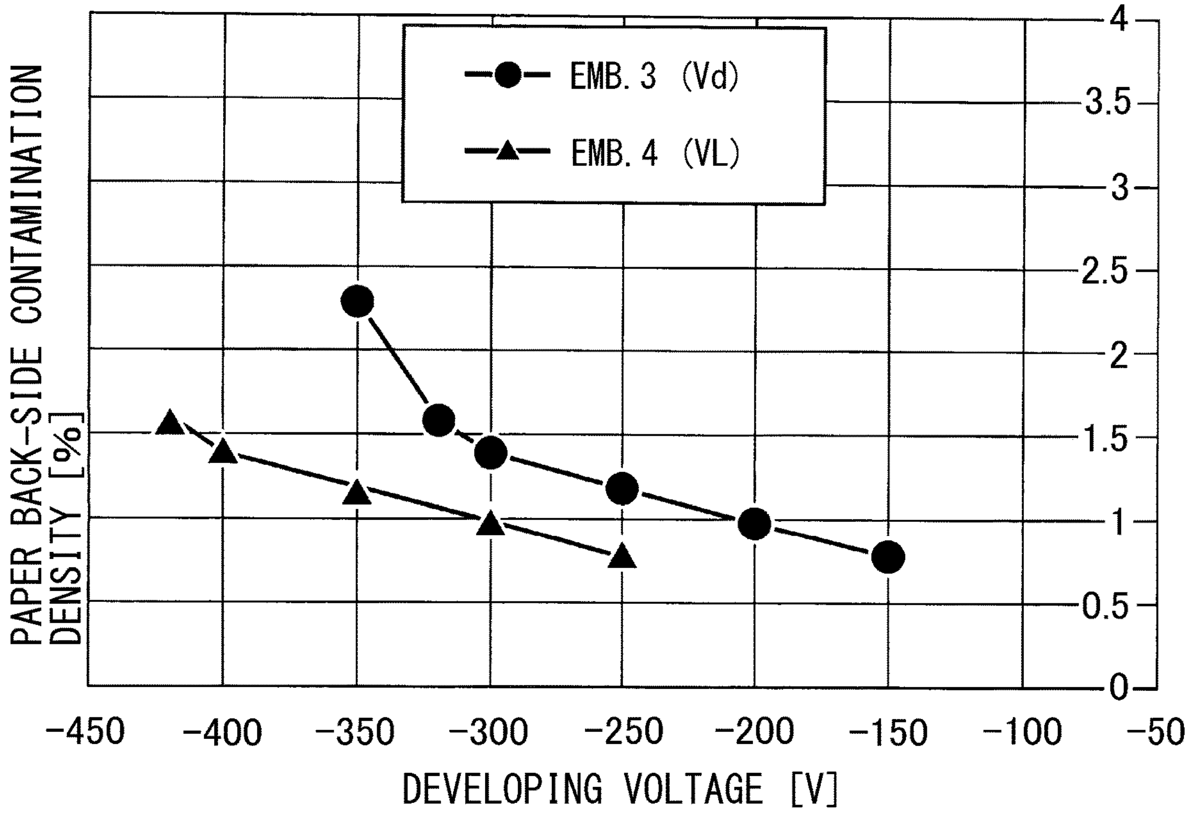
FIG. 17 is a graph showing another example of the relationship between the developing voltage and the cleaning performance.

Next, by using FIG. 17, a relationship between the developing voltage and the cleaning performance for (cleaning) the transfer roller 8 in this embodiment will be described. FIG. 17 is a graph showing a result of an experiment of the cleaning performance when the developing voltage (and the cleaning voltage) during the cleaning operation is changed in the image forming apparatus 1 in the constitution of this embodiment. Incidentally, an experiment condition in this embodiment is similar to that described in the embodiments 1 to 3.

Specifically, the experiment was conducted by being divided into two consisting of "preliminary sheet (paper) passing" in which the toner contamination is deposited on the transfer roller 8 and "sheet (paper) back-side contamination sheet passing" for evaluating sheet back-side contamination after the cleaning operation is executed. The developing voltage during the preliminary sheet passing was set at −350 V, and the developing voltage during the paper back contamination evaluation sheet passing was changed at levels shown in FIG. 17.

In FIG. 17, "EMB. 3 (Vd)" as an explanatory legend refers to a result of the constitution described in the embodiment 1, and specifically, an experimental result on a condition such that the developing roller 21 is not separated from the photosensitive member 2 during the cleaning operation and that the toner after the 10K durability (test) is used. That is, the "EMB. 3 (Vd)" in FIG. 17 shows the result of FIG. 15 again for comparison.

In FIG. 17, "EMB. 4 (VL) as an explanatory legend refers to an experimental result of this embodiment in which an exposure operation of the photosensitive member 2 by the laser scanner 4 is performed during the cleaning operation. Further, this experimental result is an experimental result on a condition that the developing roller 21 is separated from the photosensitive member 2 during the cleaning operation and that the toner after the 10K durability (test) is used. When the result of the embodiment 2 and the result of this embodiment (embodiment 4) are compared with each other, it is understood that in the result of this embodiment, a similar level of prevention of the paper back contamination can be achieved at the developing voltage larger in absolute value (i.e., at the cleaning voltage smaller in absolute value). This shows that in this embodiment, the photosensitive member 2 is subjected to the exposure operation by the laser scanner 4 during the cleaning operation, and therefore, even at a cleaning voltage smaller in absolute value, a sufficient potential difference described above is formed and thus good cleaning of the transfer roller 8 can be performed.

Based on the above-described evaluation results, in a table 3 below, a performance evaluation result for the paper back contamination in each of the to constitution of this embodiment (embodiment 4), and the constitution of the embodiment 3 is shown.

TABLE 3

| | | SETTING*2 | | | |
|---|---|---|---|---|---|
| | SP*1 | DV*3 (V) | TRCV*4 (V) | PBC*5 [%] | DEGREE OF PBC*5 |
| EMB. 4 | VL | −250 | −1000 | 0.8 | GOOD |
| EMB. 3 | Vd | −150 | −1400 | 0.8 | GOOD |

*1"SP" is the surface potential of the photosensitive member during cleaning of the transfer roller.
*2"SETTING" is voltage setting during cleaning of the transfer roller.
*3"DV" is the developing voltage.
*4"TRCV" is the transfer roller cleaning voltage.
*5"PBC" is the paper back contamination.

First, the result of this embodiment (embodiment 4) will be described. In this embodiment, the exposure operation of the photosensitive member 2 by the laser scanner 4 is performed during the cleaning operation. The developing voltage during the image formation is set at −350 V. Further, the developing voltage during the cleaning operation is set at −250 V, with the result that the cleaning voltage is set at −1000 V. On this condition, when the preliminary sheet passing the paper back contamination evaluation sheet passing were performed, the paper back contamination density was 0.8%, and a degree of the paper back contamination by eye observation discrimination was "good". It is understood that this result shows that a similar level of prevention of the paper back contamination to the case where the developing voltage during the cleaning operation is set at −150 V with the result that the cleaning voltage is set at −1400 V is achieved. Incidentally, the constitution of the embodiment 3 is such that the exposure operation of the photosensitive member 2 by the laser scanner 4 is not performed during the cleaning operation.

As described above, in this embodiment, good cleaning of the transfer roller 8 can be performed with a commoner change in developing voltage. It would be considered that the constitution of this embodiment is effective in the following cases from the viewpoint that a degree of freedom of the high-voltage circuit is enhanced. That is, the case where a user (operator) desires to shorten a convergence time of the developing voltage by suppressing a change range of the developing voltage to a small value during the cleaning operation, the case where it is desirable that a voltage range used is made small from the viewpoint of a voltage output performance of the developing voltage applying portion E2, and the like case can be cited.

Incidentally, in this embodiment, the case where the high-voltage circuit constitution similar to the high-voltage circuit constitution in the embodiment 3 was used was described, but in the case where the high-voltage circuit constitution similar to those in the embodiments 1 and 2 is used, the exposure of the photosensitive member 2 by the laser scanner 4 may be performed similarly as in this embodiment.

Further, in this embodiment, description was made such that the exposure by the laser scanner 4 is performed in a whole region with respect to the rotational direction of the photosensitive member passing through the transfer nip in a period in which the cleaning voltage is applied to the transfer roller 8 during the cleaning operation. However, the present invention is not limited thereto. A corresponding effect can be obtained by subjecting the surface of the photosensitive member 2 passing through the transfer nip N to the exposure in at least a part of the period in which the cleaning voltage is applied to the transfer roller 8 during the cleaning operation. That is, the controller 100 is capable of controlling the exposure device 4 so that the surface of the photosensitive member 2 passing through the transfer portion N is exposed to light in at least a part of a period in which the voltage of the same polarity as the normal charge polarity of the toner is applied to the transfer member (roller) 8 during the non-image forming operation.

Next, another embodiment (embodiment 5) of the present invention will be described. Basic constitution and operation of an image forming apparatus of this embodiment are the same as those in the embodiments 1 to 4. Accordingly, in the image forming apparatus of this embodiment, elements having the same or corresponding functions or constitutions to those of the image forming apparatuses in the embodiments 1 to 4 will be omitted from detailed description by adding the same reference numeral or symbols as those in the embodiments 1 to 4.

In the embodiment 4, the type in which the effective voltage is outputted as the cleaning voltage by changing the developing voltage during the cleaning operation was employed. On the other hand, in this embodiment (embodiment 5), a type in which the effective voltage is outputted as the cleaning voltage by changing the charging voltage. Incidentally, the high-voltage circuit constitution of the image forming apparatus 1 is similar to those of the image forming apparatuses of the embodiments 3 and 4.

As regards a method of changing the cleaning voltage by the change in charging voltage, in the embodiment 3, description was made using FIG. 13, so that detailed description will be omitted. As in this embodiment, in the case where the cleaning voltage is changed by changing the charging voltage, it becomes possible to change the set value of the cleaning voltage depending on the set value of the charging voltage or a load state of the charging roller 3.

Figure 18:
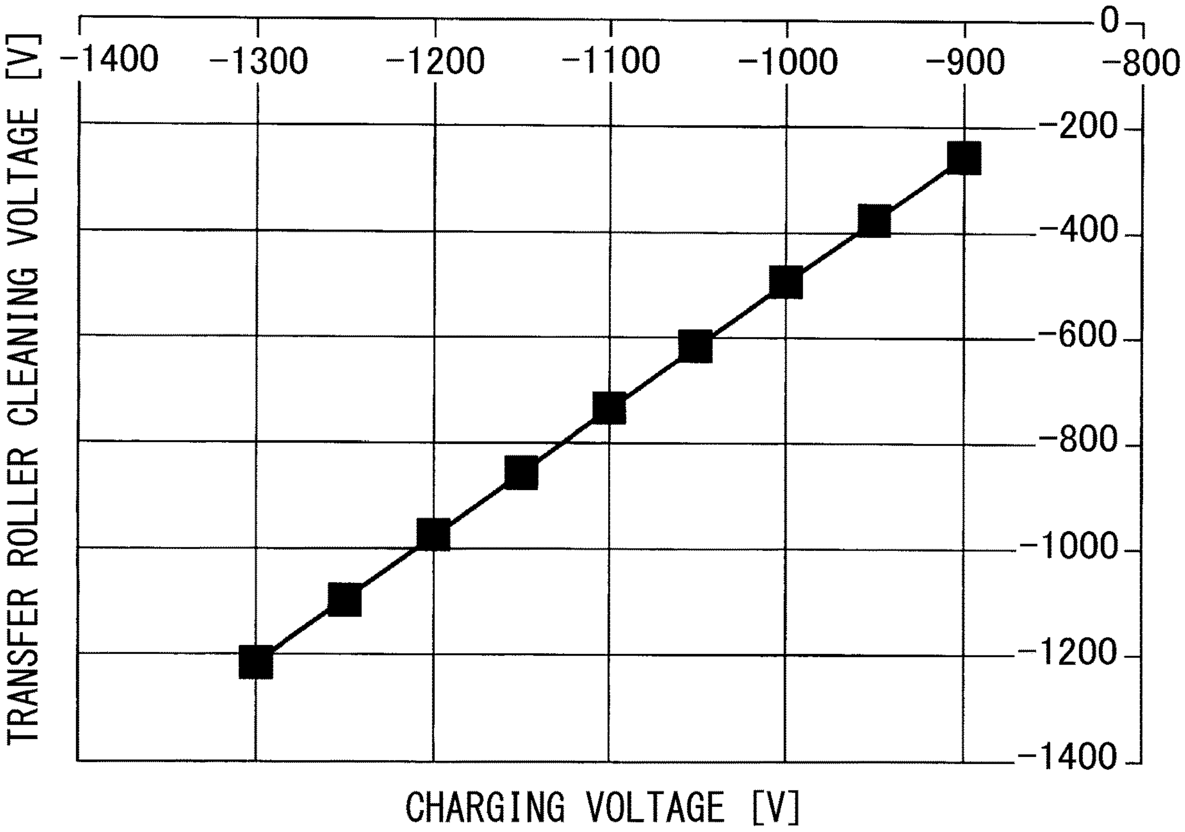
FIG. 18 is a graph showing a relationship between the cleaning voltage and a charging voltage.

In the constitution of this embodiment, a relationship between the set value of the charging voltage and the set value of the cleaning voltage in the case where the set value of the charging voltage is changed is shown in FIG. 18. As is understood from FIG. 18, in this embodiment, in the case where the charging voltage is changed to −1000 V which is the charging voltage during the image formation the cleaning voltage of about −700 V is applied to the transfer roller 8. Further, for example, when the charging voltage is changed to −1210 V during the cleaning operation, the cleaning voltage of about −1000 V more effective in cleaning of the transfer roller 8 is applied to the transfer roller 8.

On the other hand, in the type in which the cleaning voltage is changed by changing the charging voltage, there is point of need to pay attention. That is, the cleaning operation is such that the toner is removed from the transfer roller 8 by electrostatically transferring the toner, deposited on the transfer roller 8, onto the photosensitive member 2 by using the potential difference between the transfer roller 8 and the photosensitive member 2. However, when the charging voltage, i.e., the surface potential of the photosensitive member 2 is simply changed, the potential difference between the transfer roller 8 and the photosensitive member 2 also changes. For that reason, in some cases, there is a possibility that a potential relationship such that the cleaning itself of the transfer roller 8 is not effectively executed is formed. In order to suppress such a situation, in this embodiment, the exposure operation of the photosensitive member 2 by the laser scanner 4 is performed during the cleaning operation, so that the surface potential of the photosensitive member 2 is stably changed to the predetermined light-portion potential VL. That is, the charging voltage is changed for adjusting the cleaning voltage during the cleaning operation, while the surface potential of the photosensitive member 2 is stably set at the predetermined light-portion potential VL by the exposure operation so as not to be influenced by this change. By this, it becomes possible to perform the stable cleaning of the transfer roller 8.

Figure 19:
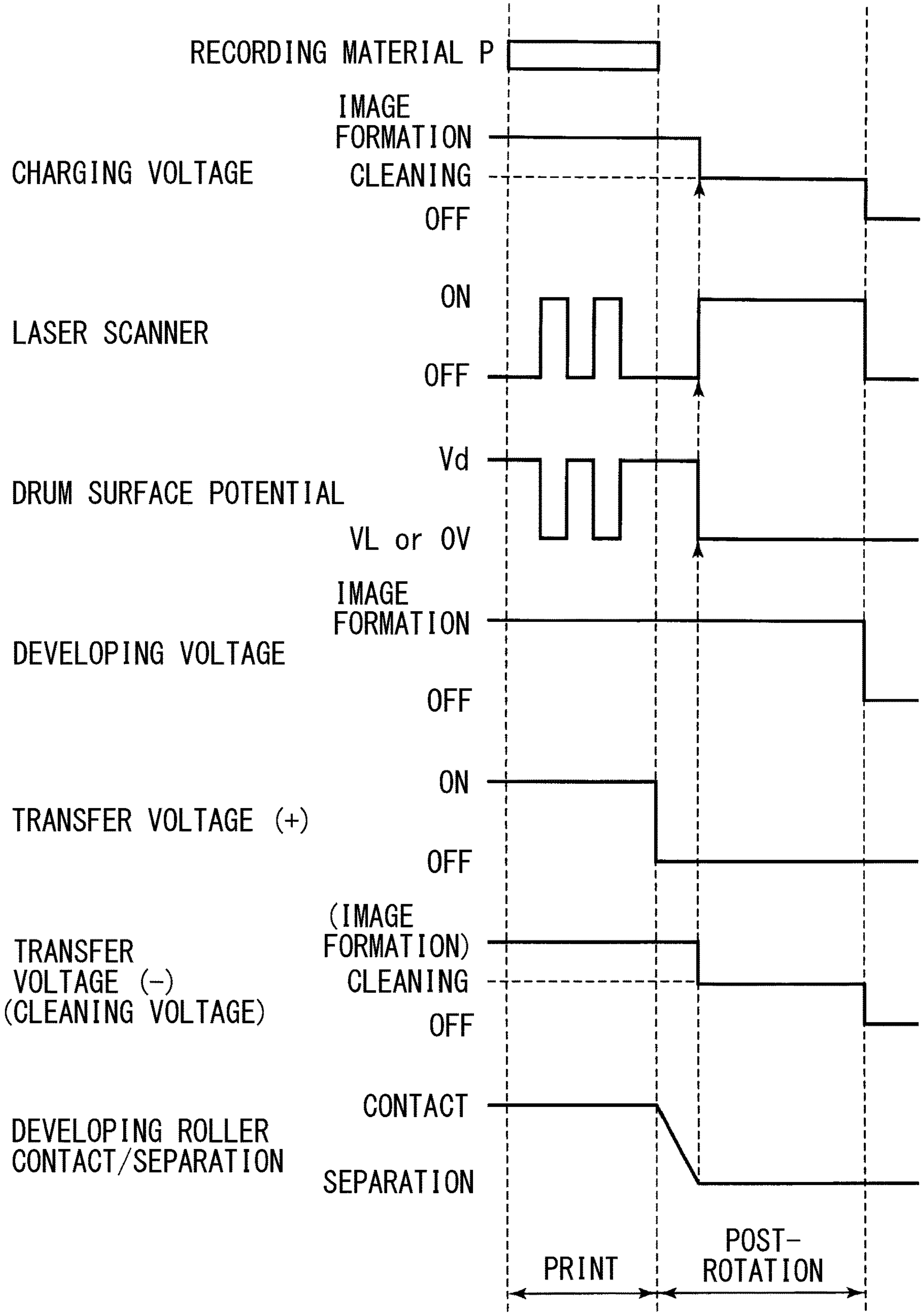
FIG. 19 is a timing chart for illustrating another example of the cleaning operation.

Next, using FIG. 19, the cleaning operation in this embodiment will be described. FIG. 19 is a timing chart showing an operation state of each of the respective portions in timings of the formation (printing) of the image on the final recording material P in the single print job and of the post-rotation after the image formation. In this embodiment, the controller 100 executes control of an operation of the print job in accordance with the timing chart shown in FIG. 19. In FIG. 19, states of the charging voltage, light emission of the laser scanner 4, the state potential of the photosensitive member 2, the developing voltage, the positive transfer voltage, the negative transfer voltage (cleaning voltage), and a developing roller contact/separation state are shown. Incidentally, the developing roller contact/separation state and items, other than the voltage control accompanying the state, and a light emission state of the laser scanner 4 are similar to those described in the embodiments 1 to 4. Further, as regards the cleaning voltage, the set value during the image formation was represented by "for image formation", and the set value during the cleaning operation was represented by "for cleaning".

In this embodiment, when the image formation is ended and the sequence goes to the post-rotation operation, the positive transfer voltage Vtrp is turned off, and substantially at the same time, a separating operation of separating the developing roller 21 from the photosensitive member 2 by the separating mechanism 40 is started. Then, after the separating operation is ended, a change in charging voltage Vpri from the set value for the image formation to the set value for the cleaning, and a change in transfer voltage (cleaning voltage) Vtrn from the set value for the image formation to the set value for the cleaning with the above-described change in developing voltage Vdev are made. Further, substantially at the same time, the light emission of the laser scanner 4 is turned on, so that a whole surface (entirety of the image forming region with respect to the direction substantially perpendicular to the movement direction of the surface of the photosensitive member 2) of the photosensitive member 2 is in the exposure state (light-portion potential VL). Thus, the light emission of the laser scanner 4 is performed after the developing roller 21 is separated from the photosensitive member 2, so that it is possible to suppress that unnecessary toner is transferred from the developing roller 21 onto the photosensitive member 2. Further, the potential difference between the photosensitive member 2 and the transfer roller 8 (cleaning voltage) during the cleaning operation is largely changed, so that the cleaning property of the cleaning of the transfer roller 8 can be improved while stably maintaining the surface potential of the photosensitive member 2 at the predetermined light-portion potential VL.

In a table 4 below, a performance environment result for the paper back contamination in each of the constitution of this embodiment (embodiment 5) and the constitution of the embodiment 4 is shown. Incidentally, a performance evaluation condition in this embodiment is similar to that described in the embodiment 1 or the like.

Specifically, the experiment was conducted by being divided into two consisting of "preliminary sheet (paper)

passing" in which the toner contamination is deposited on the transfer roller 8 and "sheet (paper) back-side contamination sheet passing" for evaluating sheet back-side contamination after the cleaning operation is executed. The developing voltage during the preliminary sheet passing and the developing voltage during the paper back contamination evaluation sheet passing was set at −350 V, and the charging voltage was set at −100 V.

TABLE 4

| | SETTING*[1] | | | | |
|---|---|---|---|---|---|
| | DV*[2] (V) | CHV*[3] (V) | TRCV*[4] (V) | PBC*[5] [%] | DEGREE OF PBC*[5] |
| EMB. 5 | −350 | −1210 | −1000 | 0.8 | GOOD |
| EMB. 4 | −250 | −1000 | −1000 | 0.8 | GOOD |

*[1]"SETTING" is voltage setting during cleaning of the transfer roller.
*[2]"DV" is the developing voltage.
*[3]"CHV" is the charging voltage.
*[4]"TRCV" is the transfer roller cleaning voltage.
*[5]"PBC" is the paper back contamination.

First, the result of this embodiment (embodiment 5) will be described. In this embodiment, during the cleaning operation, the developing voltage is set at −350 V which is the same as the developing voltage during the image formation, and the charging voltage is changed from the charging voltage during the image formation and is set at about −1210 V. Thus, the charging voltage is changed from the charging voltage during the image formation, so that the cleaning voltage during the cleaning operation is adjusted to −1000 V. On this condition, when the preliminary sheet passing the paper back contamination evaluation sheet passing were performed, the paper back contamination density was 0.8%, and a degree of the paper back contamination by eye observation discrimination was "good".

Next, the result of the embodiment 4 will be described. In the constitution of the embodiment 4, during the cleaning operation, the charging voltage is set at −1000 V which is the same as the charging voltage during the image formation, and the developing voltage is changed from the developing voltage during the image formation and is set at −250 V. By this, the cleaning voltage during the cleaning operation is adjusted to −1000 V. Even on this condition, the paper back contamination was 0.8%, and the degree of the paper back contamination by eye observation discrimination was "good".

That is, between this embodiment and the embodiment 4, cleaning voltage adjusting methods are different from each other, but the set values of the cleaning voltages were the same, and therefore, the cleaning performances for the transfer rollers 8 were the same.

Thus, the image forming apparatus 1 may include the common power source 60 for supplying the voltages to the developing voltage applying portion E2, the charging voltage applying portion E1, and the second transfer voltage applying portion E4. In this case, the controller 100 may control the change in output of the common power source 60 so that at least one of a change in voltage value between the voltage applied from the developing voltage applying portion E2 to the developing member 21 during the cleaning operation and the voltage applied from the developing voltage applying portion E2 to the developing member 21 during the toner image formation and a change in voltage value between the voltage applied from the charging voltage applying portion E1 to the charging member 3 during the cleaning operation and the voltage applied from the charging voltage applying portion E1 to the charging member 3 during the charging is made. Further, the controller 100 is capable of controlling the above-described change so that the absolute value of the voltage applied from the second transfer voltage applying portion E4 to the transfer member 8 during the cleaning operation is larger than the absolute value of the voltage in the case where the above-described charge is not made.

As described above, in this embodiment, as the cleaning voltage adjusting method during the cleaning operation, the type of changing the cleaning voltage was used. Also, in this case, similarly a in the case where the type of changing the developing voltage (the voltages applied to developing members such as the developer carrying member, the regulating member, and the supplying member), it is possible to perform good cleaning of the transfer roller 8.

Incidentally, in this embodiment, as the cleaning voltage adjusting method, description was made that the charging voltage is changed singly, but the present invention is not limited thereto. For adjusting the cleaning voltage, it is possible to use a plurality of voltage applying portions such as the developing voltage applying portion (voltage applying portion for applying the voltage to the developing member such as the developer carrying member, the regulating member, or the supplying member), the charging voltage applying portion, and the like. For example, it is possible to adjust the cleaning voltage by combining a plurality of voltage changing methods, such as a combination of a change in developing voltage and a change in charging voltage.

As described above, the present invention was described based on the specific examples, but the present invention is not limited thereto.

In the above-described embodiments, the image forming apparatus 1 was constituted to execute the cleaning operation for moving the toner from the transfer roller 8 to the photosensitive member 2 under application of the voltage of the same polarity as the normal charge polarity of the toner to the transfer roller 8 when the recording material P was not present in the transfer nip N. However, the non-image forming operation different from the image forming operation for forming the toner image on the recording material P is not limited to the cleaning operation for the transfer roller 8. For example, the non-image forming operation may be toner purge performed for ensuring a lubricating property of the cleaner 6 forming the contact portion in contact with the photosensitive member 2 by depositing the toner, carried on the developing roller 21, on the photosensitive member 2 when the recording material P is not present in the transfer nip N. Specifically, in order to cause the toner to reach the contact portion, the toner has to pass through the transfer nip N which is the contact portion between the photosensitive member 2 and the transfer roller 8. At that time, in order to suppress that the toner is deposited on the transfer roller 8, there is a need to apply the transfer voltage of the same polarity as the normal charge polarity of the toner to the transfer roller 8, so that the absolute value of the transfer voltage is made larger than the absolute value of the surface potential formed on the photosensitive member 2 in the transfer nip N. Even in such a constitution, similarly as in the above-described embodiments, there is a need to carry out control of the transfer voltage of the same polarity as the normal charge polarity of the toner applied to the transfer roller 8.

Further, in the above-described embodiments, the case where the transfer member is the transfer roller was described, but the transfer member is not limited to the transfer roller. The transfer member may be constituted by, for example, including a rotatable endless belt contactable to the photosensitive member. On an inner peripheral surface side of this transfer belt, in a position opposing the photosensitive member, a voltage applying member (roller, brush, sheet, or the like) for applying the voltage to the transfer belt may be disposed.

Further, in the above-described embodiments, the case where the photosensitive member is the photosensitive drum was described, but the photosensitive member is not limited to the photosensitive drum. The photosensitive member may also be photosensitive belt constituted in an endless belt shape.

According to the present invention, the individual power source for applying the voltage of the same polarity as the normal charge polarity of the toner to the transfer member is not provided, so that it is possible to effectively apply the voltage of the same polarity as the normal charge polarity of the toner to the transfer member while realizing the downsizing and the cost reduction of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-152693 filed on Sep. 17, 2021, which is hereby incorporated by reference herein in its entirety.

What is claimed is:

1. An image forming apparatus comprising:

a rotatable photosensitive drum;

a charging roller configured to electrically charge a surface of said photosensitive drum;

a developing roller configured to form a toner image by depositing toner on said photosensitive drum;

a developing voltage applying portion configured to apply a developing voltage to said developing roller;

a transfer roller forming a transfer portion in contact with the surface of said photosensitive drum and configured to transfer the toner image from the surface of said photosensitive drum onto a recording material passing through the transfer portion;

a first transfer voltage power source configured to apply, to said transfer roller, a transfer voltage of an opposite polarity to a normal charge polarity of the toner;

a second transfer voltage power source configured to apply, to said transfer roller, a transfer voltage of the same polarity as the normal charge polarity of the toner;

a common power source configured to supply voltages to said developing voltage applying portion and said second transfer voltage power source; and a controller capable of controlling said common power source, wherein said controller carries out control so as to execute an image forming operation for forming the toner image on the recording material and a non-image forming operation different from the image forming operation and so as to execute, as the non-image forming operation, a cleaning operation for moving the toner from said transfer roller onto said photosensitive drum under application of the voltage of the same polarity as the normal charge polarity from said second transfer voltage power source to said transfer roller when the recording material is absent in the transfer portion, and said controller controls said common power source in the non-image forming operation, and wherein said controller controls a change in output of said common power source so that a value of the voltage applied from said developing voltage applying portion to said developing roller during the cleaning operation differs from a value of the voltage applied from said developing voltage applying portion to said developing roller during formation of the toner image so that an absolute value of the voltage applied from said second transfer voltage power source to said transfer roller during the cleaning operation is greater than an absolute value of the voltage applied from said second transfer voltage power source to said transfer roller during the image formation operation.

2. An image forming apparatus according to claim 1, wherein, when the voltage of the opposite polarity is applied to said transfer roller, said controller carries out control so that to said first transfer voltage power source, a voltage in a superposed form of the voltage of the same polarity outputted from said common power source and the voltage of the opposite polarity outputted from another power source is supplied.

* * * * *